United States Patent
Kang et al.

(10) Patent No.: US 10,313,931 B2
(45) Date of Patent: Jun. 4, 2019

(54) METHOD AND APPARATUS FOR DETERMINING BASE STATIONS PROVIDING COOPERATIVE COMMUNICATION TO A MOBILE STATION IN A COMMUNICATION SYSTEM

(71) Applicant: Samsung Electronics Co., Ltd., Suwon-si (KR)

(72) Inventors: Hyun-Jeong Kang, Seoul (KR); Rakesh Taori, Suwon-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/478,102

(22) Filed: Apr. 3, 2017

(65) Prior Publication Data

US 2017/0208504 A1 Jul. 20, 2017

Related U.S. Application Data

(63) Continuation of application No. 14/164,039, filed on Jan. 24, 2014, now Pat. No. 9,615,292.

(30) Foreign Application Priority Data

Jan. 25, 2013 (KR) ........................ 10-2013-0008897

(51) Int. Cl.
*H04W 8/22* (2009.01)
*H04B 7/024* (2017.01)
(Continued)

(52) U.S. Cl.
CPC ............ *H04W 28/18* (2013.01); *H04B 7/024* (2013.01); *H04B 17/318* (2015.01); *H04W 8/22* (2013.01);
(Continued)

(58) Field of Classification Search
CPC ....... H04W 28/18; H04W 88/08; H04B 7/024
(Continued)

(56) References Cited

U.S. PATENT DOCUMENTS 8,639,256 B2 * 1/2014 Garavaglia ............ H04B 7/024
370/252
9,071,290 B2 * 6/2015 Osterling ............... H04B 7/024
(Continued)

FOREIGN PATENT DOCUMENTS

CN 102577150 A 7/2012
WO WO 2012/022159 A1 2/2012

OTHER PUBLICATIONS

Office Action dated Jun. 20, 2017 in connection with Chinese Patent Application No. 201480006042.4.
(Continued)

*Primary Examiner* — Shahriar Behnamian

(57) ABSTRACT

A method of determining member Base Stations (BSs) providing cooperative communication to a Mobile Station (MS) in a communication system. The method includes when a candidate list of the member BSs generated using at least one of strengths of signals received from adjacent BSs and cell loading state information of the adjacent BSs is received from the MS, selecting candidate BSs having a service quality larger than or equal to a threshold from candidate BSs included in the candidate list as targets to receive a member negotiation; and performing a capability negotiation with each of the selected targets to receive the member negotiation to select final member BSs and transmitting information on the determined final member BSs to the MS.

20 Claims, 27 Drawing Sheets

(51) Int. Cl.
*H04W 28/18* (2009.01)
*H04W 48/16* (2009.01)
*H04W 64/00* (2009.01)
*H04W 88/08* (2009.01)
*H04B 17/318* (2015.01)

(52) U.S. Cl.
CPC ......... *H04W 48/16* (2013.01); *H04W 64/003* (2013.01); *H04W 88/08* (2013.01)

(58) Field of Classification Search
USPC ........................................................ 455/434
See application file for complete search history.

(56) References Cited

U.S. PATENT DOCUMENTS

| | | | |
|---|---|---|---|
| 9,615,292 B2* | 4/2017 | Kang | H04W 28/18 |
| 2011/0034175 A1 | 2/2011 | Fong et al. | |
| 2011/0098072 A1* | 4/2011 | Kim | H04L 5/0032 |
| | | | 455/509 |
| 2011/0218010 A1* | 9/2011 | Hoymann | H04B 7/024 |
| | | | 455/513 |
| 2011/0269459 A1 | 11/2011 | Koo et al. | |
| 2011/0281585 A1 | 11/2011 | Kwon et al. | |
| 2012/0076038 A1 | 3/2012 | Shan et al. | |
| 2012/0135771 A1 | 5/2012 | Futaki | |
| 2012/0184322 A1 | 7/2012 | Falconetti et al. | |
| 2012/0202498 A1* | 8/2012 | Sachs | H04W 28/18 |
| | | | 455/436 |
| 2012/0282964 A1* | 11/2012 | Xiao | H04B 7/024 |
| | | | 455/515 |
| 2013/0128763 A1* | 5/2013 | Shang | H04W 48/16 |
| | | | 370/252 |
| 2014/0177601 A1* | 6/2014 | Nishio | H04W 24/10 |
| | | | 370/332 |

OTHER PUBLICATIONS

Extended European Search Report dated Jul. 21, 2016 in connection with European Application No. 14743574.7, 10 pages.
3GPP TR 36.819 V11.1.0, "3rd Generation Partnership Project; Technical Specification Group Radio Access Network; Coordinated Multi-Point Operation for LTE Physical Layer Aspects (Release 11)", Dec. 2011, 69 pages.
Huawei, "RAN2 Considerations for Coordinated Multipoint Transmission and Reception", R2-092178, 3GPP TSG-RAN WG2 Meeting #65bis, Seoul, Korea, Mar. 23-27, 2009, 3 pages.
Panasonic, "CoMP Measurement Set Management", 3GPP TSG RAN WG1 Meeting #68, R1-120226, Dresden, Germany, Feb. 6-10, 2012, 3 pages.
International Search Report dated May 16, 2014 in connection with International Patent Application No. PCT/KR2014/000711, 3 pages.
Written Opinion of the International Searching Authority dated May 16, 2014 in connection with International Patent Application No. PCT/KR2014/000711, 5 pages.

* cited by examiner

METHOD AND APPARATUS FOR DETERMINING BASE STATIONS PROVIDING COOPERATIVE COMMUNICATION TO A MOBILE STATION IN A COMMUNICATION SYSTEM

CROSS-REFERENCE TO RELATED APPLICATION(S) AND CLAIM OF PRIORITY

The present application is a continuation of U.S. patent application Ser. No. 14/164,039 filed Jan. 24, 2014, which is related to and claims the benefit under 35 U.S.C. § 119(a) of a Korean patent application filed in the Korean Intellectual Property Office on Jan. 25, 2013 assigned Serial No. 10-2013-0008897, all of which are incorporated herein by reference into the present disclosure as if fully set forth herein.

TECHNICAL FIELD

The present disclosure relates to a method and an apparatus for determining base stations providing cooperative communication to a mobile station in a communication system.

BACKGROUND

A wireless communication system has been rapidly developed. Particularly, due to various demands of users, the wireless communication system required to support a high speed and large capacity data service is being developed. Accordingly, in order to support such a large capacity data service, the wireless communication system considers using a high frequency band such as a millimeter wave.

Further, a communication system in which a plurality of base stations cooperate with each other and provide a service to a Mobile Station (MS), that is, a communication system using a multi-base station cooperation scheme is currently proposed and research on the communication system is continuously being progressed.

However, in general, when a high frequency band is used, it is highly likely to generate a large loss of a link between a Mobile Station (MS) and a Base Station (BS) and a rapid change in intensity of a received signal.

Accordingly, a method of providing more efficient communication to the MS in the high frequency band is required.

SUMMARY

To address the above-discussed deficiencies, it is a primary object to provide a method and an apparatus for determining BSs providing cooperative communication to an MS in a communication system.

The present disclosure provides conditions for selecting and determining BSs providing cooperative communication to an MS in a communication system and a method and an apparatus for operating the same.

In accordance with an aspect of the present disclosure, a method of determining member Base Stations (BSs) providing cooperative communication to a Mobile Station (MS) in a communication system is provided. The method includes: when a candidate list of the member BSs generated using at least one of strengths of signals received from adjacent BSs and cell loading state information of the adjacent BSs is received from the MS, selecting candidate BSs having a service quality larger than or equal to a threshold from candidate BSs included in the candidate list as targets to receive a member negotiation; and performing a capability negotiation with each of the selected targets to receive the member negotiation to select final member BSs and transmitting information on the determined final member BSs to the MS.

In accordance with another aspect of the present disclosure, a method of determining member Base Stations (BSs) providing cooperative communication to a Mobile Station (MS) in a communication system is provided. The method includes: generating a candidate list of the member BSs by using at least one of strengths of signals received from adjacent BSs and cell loading state information of the adjacent BSs; and transmitting the candidate list to a serving BS.

In accordance with another aspect of the present disclosure, a serving Base Station (BS) determining member BSs providing cooperative communication to a Mobile Station (MS) in a communication system is provided. The serving BS includes: a controller that, when recognizing a candidate list of member BSs generated using at least one of strengths of signals received from adjacent BSs and cell loading state information of the adjacent BSs from the MS, selects candidate BSs having a service quality larger than or equal to a threshold among candidate BSs included in the candidate list as targets to receive a member negotiation, performs a capability negotiation with each of the selected targets to receive the member negotiation to determine final member BSs, and controls to transmit information on the determined final member BSs to the MS through a transceiver.

In accordance with another aspect of the present disclosure, a Mobile Station (MS) determining member Base Stations (BSs) providing cooperative communication to the MS in a communication system is provided. The MS includes: a controller that generates a candidate list of the member BSs by using at least one of strengths of signals received from adjacent BSs and cell loading state information of the adjacent BSs and controls a transceiver to transmit the candidate list to a serving BS.

The present disclosure provides a method of selecting BSs providing cooperative communication to an MS in a communication system, thereby improving whole system performance of the communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter exemplary embodiments of the present disclosure will be described in detail with reference to the accompanying drawings. In the following description, it should be noted that only a part required for understanding operations according to the present disclosure is described and other parts are omitted so as not to make the subject matter of the present disclosure unclear.

The present disclosure provides conditions for determining BSs providing cooperative communication to an MS in a communication system and a method of operating the conditions. Further, a case where a cooperative communication-based cell provided by the present disclosure is configured and re-configured can be applied to all of cases where the MS performs an initial network entry process, wakes up from an idle mode and then performs a network re-entry process, and performs a connected mode operation.

Figure 1:
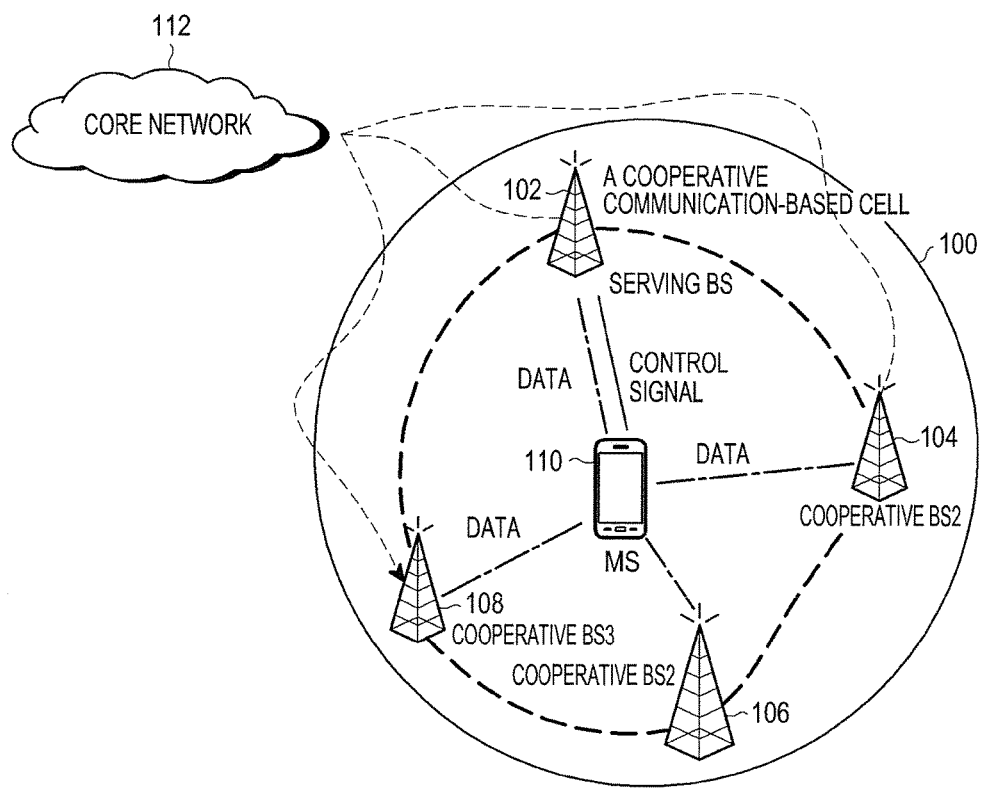
FIG. 1 illustrates a structure of a communication system according to an embodiment of the present disclosure.

FIG. 1 illustrates a structure of a cooperative communication-based cell according to an embodiment of the present disclosure.

Referring to FIG. 1, a cooperative communication-based cell 100 includes member BSs providing cooperative communication to an MS 110. For example, the member BSs include a serving BS 102 and cooperative BS#1, BS#2, and BS#3 104, 106, and 108. The member BSs of the cooperative communication-based cell 100, that is, the serving BS 102 and cooperative BS#1, BS#2, and BS#3 104, 106, and 108 participate in data transmission to the MS 110 through a multi-BS cooperation scheme. Although a case where there are three cooperative BSs is described herein as an example, the number of cooperative BSs has no limitation. The serving BS is determined as a BS which the MS initially accesses. Thereafter, the serving BS may be selected as a member BS which satisfies at least one or all of conditions based on strength of a signal transmitted/received to/from the MS, BS load, and BS power (for example, a battery level or the like) from all the member BSs.

Hereinafter the present disclosure provides conditions for selecting and determining the member BSs providing the cooperative communication to the MS and a detailed operation for the conditions.

Hereinafter, in this illustrative embodiment of the present disclosure, the MS generates a candidate BS list including candidate BSs of the member BSs providing the cooperative communication to the MS based on measurement information of adjacent BSs to be scanned by the MS and transmits the generated candidate BS list to the serving BS. Then, the serving BS finally determines member BSs based on the candidate BSs included in the candidate BS list.

Figure 2:
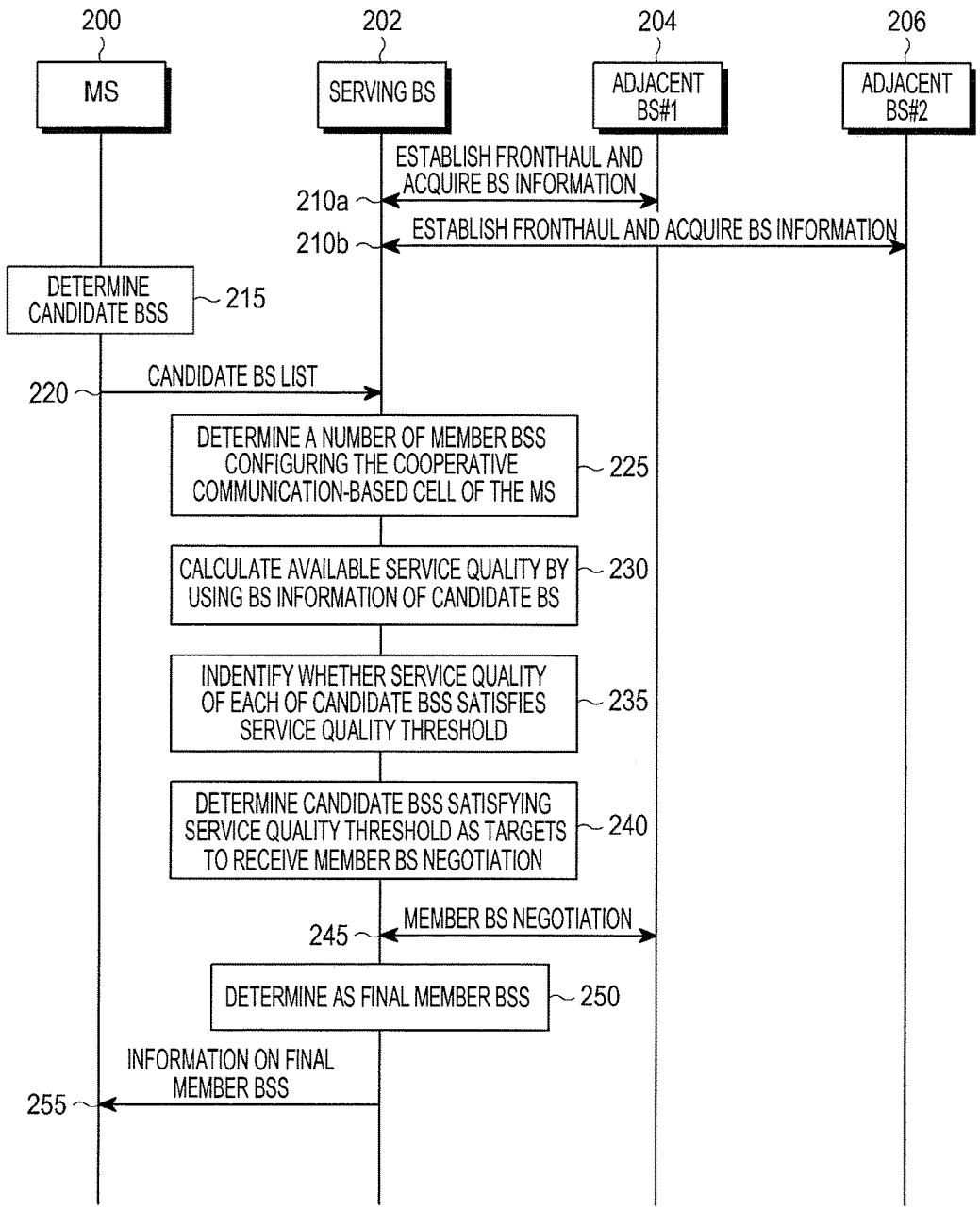
FIG. 2 illustrates an example of a flowchart of an overall operation for determining BSs providing cooperative communication to an MS according to an illustrative embodiment of the present disclosure.

FIG. 2 is a flow diagram illustrating an overall operation for determining the member BSs configuring the cooperative communication-based cell of the MS according to an illustrative embodiment of the present disclosure. For the convenience of description, a serving BS 202 configuring the cooperative communication-based cell of an MS 200 has been already determined and adjacent BSs managed by the serving BS 302 are, for example, two BSs including adjacent BS#1 204 and BS#2 206. However, the number of adjacent BSs managed by the serving BS may be different from the example of FIG. 2 in practice.

Referring to FIG. 2, in steps 210a to 210b, the serving BS 202 managing the cooperative communication-based cell of the MS 200 performs a fronthaul establishment process with adjacent BSs, for example, adjacent BS#1 204 and adjacent BS#2 206 to acquire in advance BS information of the corresponding adjacent BSs from adjacent BS#1 204 and adjacent BS#2 206. The fronthaul refers to a link directly established for communication for the serving BS and each of the adjacent BSs. The BS information of the adjacent BSs refers to corresponding BS positions and basic capability. The BS position includes a position of the corresponding BS from each of the MS 200 and the serving BS 202, a number of BSs located between BSs determined based on the corresponding BS (hereinafter referred to as a "hop"), and a hop count between the corresponding BS and a data gateway. The basic capability corresponds to remaining battery power which can be statistically calculated for the corresponding BS, buffering capacity, and antenna information. The antenna information corresponds to a number of available antennas of the corresponding BS, a number of Radio Frequency (RF) chains of the BS, a number of transmission/reception beams of the BS, and indication information on an optimal transmission/reception beam. In step 215, the MS 200 determines candidate BSs satisfying a predetermined candidate BS determination condition from adjacent BSs included in a scanning BS set and configures a candidate BS list by the candidate BSs. The scanning BS set may include the serving BS of the MS 200, adjacent BSs received from the serving BS, or adjacent BSs which can be scanned through recognition by the MS 200 without the aid of the serving BS. The candidate BS determination condition may include, for example, a condition in which strength of a signal received from each of the adjacent BSs included in the scanning BS set is larger than or equal to a predetermined signal strength or a condition in which cell loading state information is larger than or equal to a preset cell load threshold to support communication within the cooperative communication-based cell. A detailed description of the candidate BS determination condition will be made with reference to FIG. 3. In another example, parameters used for the candidate BS determination condition may include BS basic setting information which the MS 200 can acquire, for example, information on a maximum buffer size, a maximum number of antennas, a maximum number of RF chains, and a maximum number of beams. Further, the candidate BS determination condition may use information required for expecting a degree of a service to be received by the MS through the corresponding BS.

In step 220, the MS 200 transmits the candidate BS list to the serving BS 202. The candidate BS list may be inserted into an access request message and the access request message may be transmitted. An operation of the MS for generating the candidate BS list will be also described in detail with reference to FIG. 3.

In step 225, the serving BS 202 determines a number of member BSs configuring the cooperative communication-based cell of the MS 200. The number of member BSs is defined as a total number of cooperative BSs except for the serving BS 202. The number of member BSs corresponds to a number of BSs which does not increase complexity of an operation of the cooperative communication-based cell and maximizes capability of throughput of the cooperative communication-based cell and also corresponds to a number of BSs which can be supported by the MS 200.

In step 230, the serving BS 202 calculates service quality which can be used within the cooperative communication-based cell by using BS information acquired from each of adjacent BS#1 204 and adjacent BS#2 206 included in the candidate BS list. For the convenience of description, it is assumed that adjacent BS#1 204 and adjacent BS#2 206 correspond to the candidate BSs included in the candidate BS list. However, hereinafter the candidate BSs included in the candidate BS list are defined as adjacent BSs which are included in the adjacent BSs of the serving BS 202 and satisfy the candidate BS determination condition of step 215 among the adjacent BSs.

In step 235, the serving BS 202 identifies whether the service quality calculated for each of the candidate BSs, that is, adjacent BS#1 204 and adjacent BS#2 206 is larger than or equal to a predetermined service quality threshold. In step 240, the serving BS 202 determines, for example, adjacent BS#1 204 having the service quality larger than or equal to the service quality threshold as a target to receive a member BS negotiation as a result of the identification. Then, in step 245, the serving BS 202 performs the member BS negotiation with adjacent BS#1 204. When the member BS negotiation is successfully performed, the serving BS 202 determines adjacent BS#1 204 as a final member BS in step 250. In the member BS negotiation, the serving BS 202 makes, to adjacent BS#1 204, a request for a BS capability state required when adjacent BS#1 204 operates as the member BS within the cooperative communication-based cell of the MS 200. For example, the BS capability state includes a channel state between the corresponding BS and the serving BS 202 (for example, Received Signal Strength Indication (RSSI), path loss and the like), a number of available antennas of the corresponding BS, currently remaining power, available buffer capacity, current cell load, and a number of available RF chains. Further, when the serving BS 202 receives a response satisfying a required BS capability state from adjacent BS#1 204, the member BS negotiation is successfully performed.

In step 255, the serving BS 202 transmits information related to the final member BS to the MS 200. The information related to the final member BS includes information informing that adjacent BS#1 204 is determined as the final member BS and information on the final member BS, that is, indication information of adjacent BS#1 204. The information may be transmitted through an access response to the access request. Although it has been described that the final member BS is only adjacent BS#1 204, if a number of final member BSs is plural, the indication information can be configured in a form of a list of the plurality of final member BSs. An operation for determining the member BS according to this illustrative embodiment of the present disclosure performed through steps 220 to 225 as described above will be described in more detail with reference to FIGS. 4A to 4E.

Figure 3:
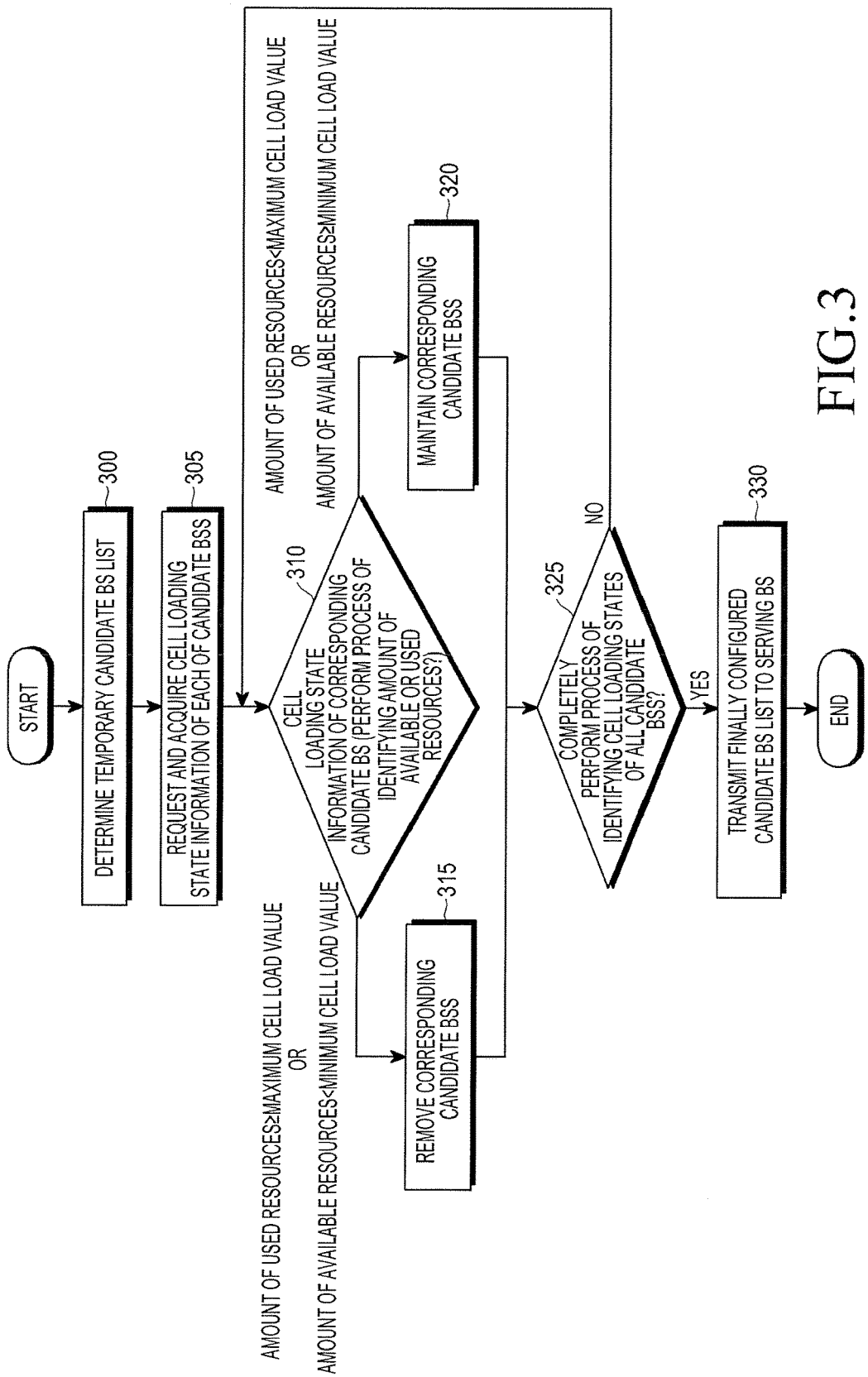
FIG. 3 illustrates an example of a flowchart of an operation in which an MS configures a candidate BS list according to an illustrative embodiment of the present disclosure.

FIG. 3 is a flowchart of an operation in which the MS configures the candidate BS list according to an illustrative embodiment of the present disclosure.

Referring to FIG. 3, in step 300, the MS selects candidate BSs satisfying the candidate BS determination condition from adjacent BSs included in the scanning BS set. Then, the MS determines a temporary candidate BS list including the selected candidate BSs. For example, it is assumed that the candidate BS determination condition is satisfied when strength of a signal received from each of the adjacent BSs included in the scanning BS set is larger than or equal to a predetermined signal strength threshold. The signal strength corresponds to, for example, a Signal Interference and Noise Ratio (SINR), a Signal to Noise Ratio (SNR), an RSSI or the like. In step 305, the MS acquires cell loading state information on each of the candidate BSs included in the temporary candidate BS list through a broadcasting channel. The cell loading state information may be indicated by an amount of resources used by the corresponding candidate BS or an amount of available resources. When it is assumed that the cell loading state information indicates the amount of the used resources, the amount of the resources may be indicated by, for example, an absolute value such as a number of used carriers.

When the cell loading state information indicates the amount of the used resources, the MS performs a cell loading state identification process of comparing the amount of the used resource indicated by the cell loading state information of the corresponding candidate BS with a predetermined threshold of used resources (hereinafter referred to as a "cell load maximum value"). Through the identification process, only for candidate BSs using the amount of the resources larger than or equal to the cell load maximum value, the MS performs step 315. The MS deletes the candidate BSs using the resources larger than or equal to the cell load maximum value from the temporary candidate BS list in step 315 and proceeds to step 325.

Through the identification process, for candidate BSs using the amount of the resources smaller than the cell load maximum value, the MS performs step 320 to continuously maintain the candidate BSs in the temporary candidate BS list and proceeds to step 325.

In another example, it is assumed that the cell loading state information indicates the amount of available resources. In this event, in step 310, the MS may perform the cell loading state identification process of comparing the amount of the available resources indicated by the cell loading state information of the corresponding BS with a predetermined threshold of an amount of available resources (hereinafter referred to as a "cell load minimum value"). In step 320, the MS continuously maintain candidate BSs which use the resources larger than or equal to the cell load minimum value within the temporary candidate BS list among the candidate BSs. In step 315, the MS deletes candidate BSs which use the resources smaller than the cell load minimum value from the temporary candidate BS list among the candidate BSs.

In step 325, the MS identifies whether the cell loading state information identification process is performed for all the candidate BSs selected in step 300. As a result of the identification, when the cell loading state information identification process is not performed for all the candidate BSs, the MS returns to step 310. Then, the MS performs the cell loading state information identification process for the next candidate BS.

As a result of the identification, when the cell loading state information identification process is performed for all the candidate BSs, the MS reflects the cell loading state information identification process to configure the candidate BS list by the selected candidate BSs and transmits the configured candidate BS list to the serving BS in step 330. The candidate BS list may be inserted into an access request message and the access request message may be transmitted.

The process of FIG. 3 as described above may be equally applied to update the member BSs of the cooperative communication-based cell in a state where the cooperative communication-based cell of the MS has been already configured, and the temporary candidate BS list may be inserted into an adjacent BS report message and the adjacent BS report message may be transmitted.

Figure 4A:
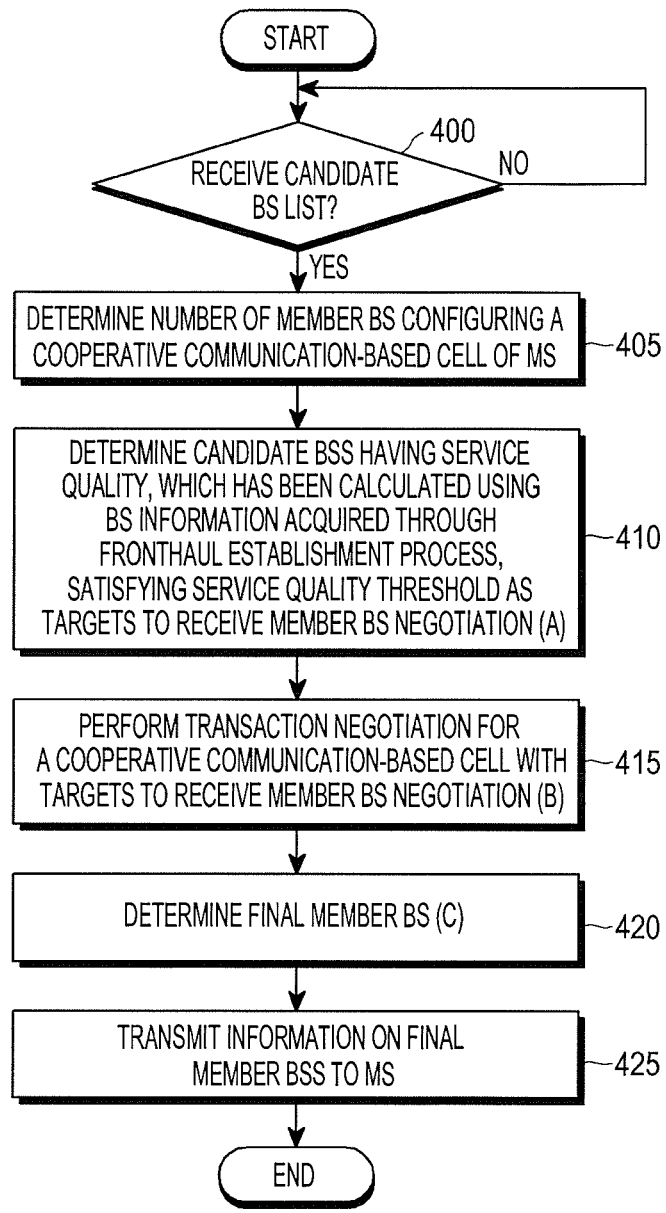
FIG. 4A illustrates an example of a flowchart of an overall operation in which a serving BS determines member BSs according to an illustrative embodiment of the present disclosure.

FIG. 4A illustrates an example of a flowchart of an overall operation in which the serving BS determines the member BSs according to this illustrative embodiment of the present disclosure.

Referring to FIG. 4A, the serving BS identifies whether the candidate BS list is received from the MS in step 400. As described above, the candidate BS list includes adjacent BSs satisfying the candidate BS determination condition among the adjacent BSs included in the scanning BS set as the candidate BSs. For example, the candidate BS determination condition may include a condition in which strength of a signal received from each of the adjacent BSs included in the scanning BS set is larger than or equal to a predetermined signal strength threshold or a condition in which cell loading state information satisfies a comparison result of a cell load threshold to support communication within the cooperative communication-based cell. As described above, the cell loading state information may indicate the amount of the available resources of the corresponding BS or the amount of the used resources. When the cell loading state information indicates the amount of the available resources of the corresponding BS, the candidate BS determination condition includes the condition in which the amount of the available resources of the corresponding BS is larger than or equal to the cell load minimum value. When the cell loading state information indicates the amount of the used resources of the corresponding BS, the candidate BS determination condition includes the condition in which the amount of the available resources of the corresponding BS is smaller than the cell load maximum value.

One or more parameters used for the candidate BS determination condition may be randomly selected by the MS or the parameter may be set to a default by the MS. When two or more parameters are selected, a case where conditions according to the two or more parameters are all satisfied or a case where only at least one of conditions according to the two or more parameters is satisfied may be set as an option of the candidate BS determination condition. When the MS acquires capability information of the corresponding BS through a signal broadcasted by the BS, the MS may determine whether the capability information of the BS is sufficient to support the communication of the MS. When the MS determines that the capability information of the BS is sufficient to support the communication of the MS, the MS may include the capability information of the BS in the candidate BS determination parameter.

As a result of the identification, when the candidate BS list is not received, the serving BS waits until the candidate BS list is received.

As a result of the identification, when the candidate BS list is received, the serving BS determines a number of member BSs configuring the cooperative communication-based cell of the MS in step 405. In step 410 (A), the serving BS calculates service quality by using BS information acquired during the fronthaul establishment process with each of the candidate BSs included in the candidate BS list and then determines candidate BSs having service quality larger than or equal to a predetermined service quality threshold as targets to receive the member BS negotiation. The threshold of the service quality will be described below in detail with reference to FIG. 4C. As described above, the BS information includes the BS position and basic capability which the serving BS acquires during the fronthaul establishment process with the corresponding BS.

Specifically, the serving BS calculates service quality of each of the candidate BSs included in the candidate BS list, for example, Equation (1) below by using the BS information acquired through the fronthaul establishment process with each of the candidate BSs.

Service quality=weightfactor 1*BS capability supporting cooperative communication-based cell operation+weightfactor 2*BS position supporting cooperative communication-based cell operation     (1)

When the corresponding candidate BS operates as the member BS within the cooperative communication-based cell of the MS, the BS capability corresponds to a number of antennas, required transmission power, required buffer capacity, and required RF chains. The BS position corresponds to a hop count between BSs satisfying latency required within the cooperative-communication-based cell, corresponding BS position from the MS and the serving BS, a path loss between BSs, and strength of a signal received by the serving BS. The preset reference corresponds to, for example, required throughput, a value of service quality, a minimum threshold of signal strength for serving the MS, a threshold of a difference between strengths of signals which the MS receives from the serving BS and the corresponding BS to be measured.

Meanwhile, when the cooperative communication-based cell is re-configured, MS mobility may be also used as a member BS negotiation condition. The MS mobility corresponds to information on a movement speed or movement direction of the MS.

In step 415 (B), the serving BS performs transaction negotiation with each of the determined targets to receive the member BS negotiation. The transaction negotiation refers to communication for identifying updated states of targets to receive the member BS negotiation. When the BS operates as the member BS configuring the cooperative communication-based cell of the MS, the transaction negotiation refers to identification of a required channel state, identification of BS load, and identification of throughput required for servicing the MS.

In step 420 (C), the serving BS determines candidate BSs having successfully passed through the transaction negotiation as the final member BSs among the targets to receive the member BS negotiation. When the number of final member BSs is smaller than a predetermined number of member BSs, the serving BS may further select candidate BSs from the candidate BSs, which do not satisfy the service quality threshold, included in the candidate BS list in order starting from highest service quality until the number of final member BSs reaches the predetermined number of member BS. The selected candidate BS is required to satisfy the BS position capability supporting the operation of the cooperative communication-based cell.

Meanwhile, when there is no final member BS determined in step 420 (C), that is, when a total number of final member BSs is "0", the serving BS selects candidate BSs, which do not satisfy the service quality threshold, corresponding to the predetermined number of member BSs in order starting from highest service quality. The selected candidate BS is required to satisfy the BS position capability supporting the operation of the cooperative communication-based cell.

In another embodiment, when the number of final member BSs exceeds the number of member BSs, the serving BS may select again final member BSs corresponding to the number of member BSs from the final member BSs in order starting from highest service quality.

In step 425, the serving BS transmits information related to the determined final member BSs to the MS.

Hereinafter, each of the operations in which the serving BS determines the member BSs according to this illustrative embodiment of the present disclosure will be described in more detail with reference to FIGS. 4B to 4E.

Figure 4B:
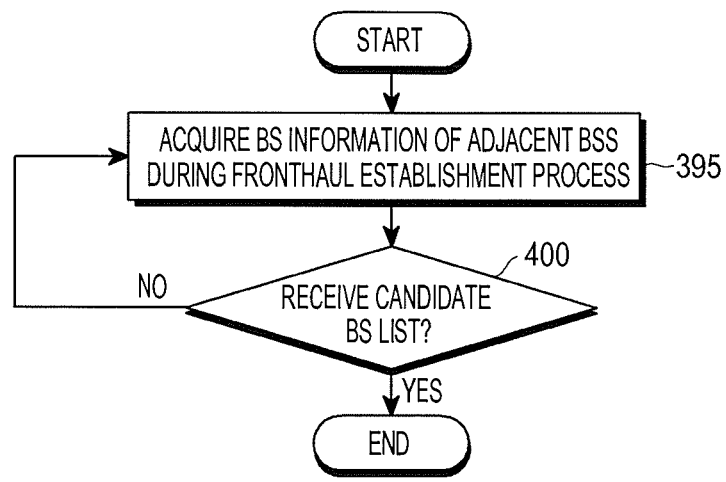
FIG. 4B illustrates an example of a flowchart of an operation before a serving BS receives a candidate BS list from an MS among the operation in which the serving BS determines the member BSs according to an illustrative embodiment of the present disclosure.

FIG. 4B is a flowchart of an operation before the serving BS receives the candidate BS list from the MS among the operation in which the serving BS determines the member BSs according to an illustrative embodiment of the present disclosure.

Referring to FIG. 4B, in step 395, the serving BS performs a process of acquiring BS information on adjacent BSs through the fronthaul establishment process with each of the corresponding adjacent BSs. Among the BS information, BS information corresponding to candidate BSs included in the candidate BS list is used for determining candidate BSs to receive the member BS negotiation. In step 400, the serving BS waits for a determination on whether to receive the candidate BS list from the MS. According to whether the serving BS receives the candidate BS list in step 400, the serving BS operates equally to steps 405 to 425 of FIG. 4A, so that a detailed description thereof will be omitted.

Figure 4C:
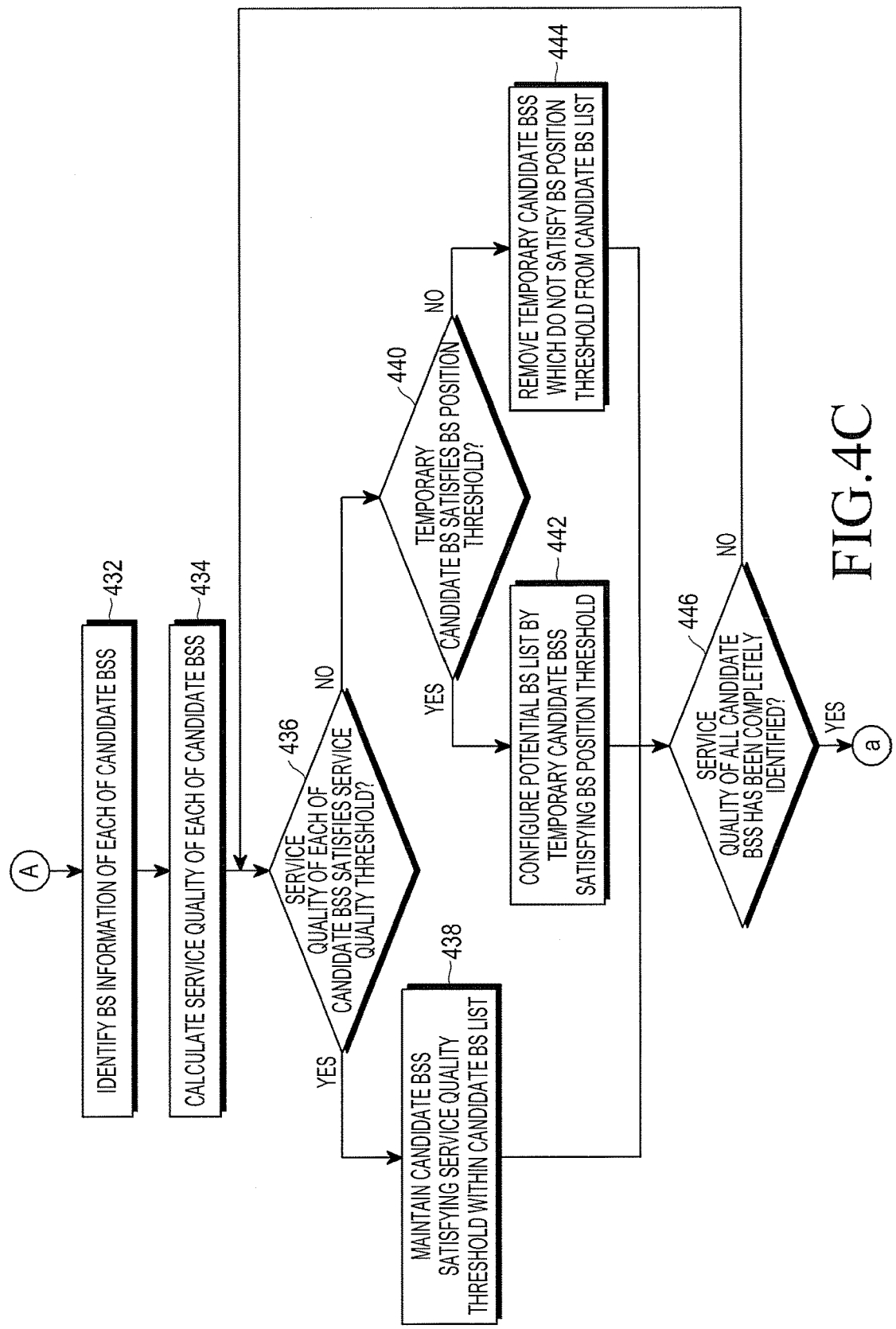
FIGS. 4C and 4D illustrate an example of a flowchart of a detailed operation for determining a target to receive a member BS negotiation among the operation of the serving BS according to an illustrative embodiment of the present disclosure.
Figure 4D:
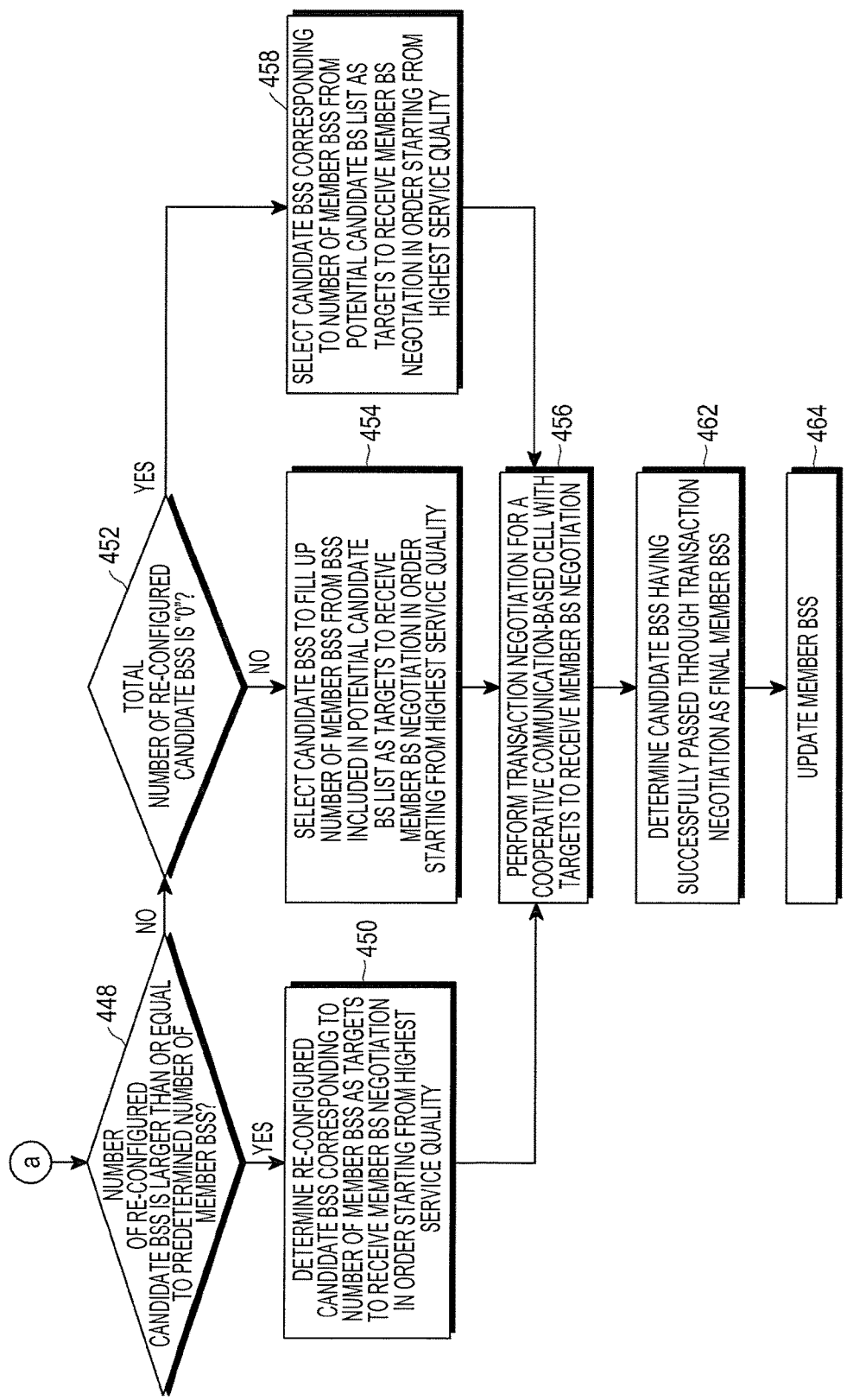

FIGS. 4C and 4D are an example of a flowchart of a detailed operation for determining the target to receive the member BS negotiation among the operation of the serving BS according to an illustrative embodiment of the present disclosure. That is, FIGS. 4C and 4D are a flowchart of a detailed operation of step 410 (A) of FIG. 4A.

Referring to FIG. 4C, in step 432, the serving BS identifies BS information on each of the candidate BSs included in the candidate BS list among the BS information pre-acquired during the fronthaul establishment process with the adjacent BSs. It is assumed that the BS information corresponds to the above mentioned BS basic capability and position information and the candidate BSs correspond to some of the adjacent BSs having established the fronthaul with the serving BS. In step 434, the serving BS calculates service quality for each of the candidate BSs by using the acquired BS information and Equation (1) above.

Hereinafter through steps 436 to 444, the serving BS determines whether to maintain the candidate BSs as members of the candidate BS list to re-configure the candidate BS list. Specifically, in step 436, the serving BS compares service quality of one of the candidate BSs with a preset service quality threshold. The service quality corresponds to, for example, throughput required within the cooperative communication-based cell, Quality of Experience (QoE), and Quality of Service (QoS). The service quality is determined through a parameter indicating the BS capability and a parameter indicating the BS position. When the corresponding candidate BS operates as the member BS within the cooperative communication-based cell of the MS, the BS capability corresponds to a number of required antennas, required transmission power, required buffer capacity, and required RF chains. The BS position corresponds to a hop count between BSs satisfying latency required within the cooperative-communication-based cell, corresponding BS position from each of the MS and the serving BS, a path loss between BSs, and strength of a signal received by the serving BS. The MS mobility may be also considered as the parameter indicating the service quality of the candidate BS.

Through a result of the comparison, the serving BS maintains the candidate BS satisfying the service quality threshold, that is, the candidate BS having the service quality larger than or equal to the service quality threshold as the member BS of the candidate BS list in step 438 and proceeds to step 446 (*a*). The serving BS proceeds to step 440 for the candidate BSs which do not satisfy the service quality threshold, that is, the candidate BSs having the service quality smaller than the service quality threshold (hereinafter referred to as "temporary candidate BSs"). In step 440, the serving BS identifies whether position information of each of the temporary candidate BS satisfies a BS position threshold. As a result of the identification, when the position information of each of the temporary candidate BSs is within the BS position threshold, the serving BS proceeds to step 442. More specifically, the position information of each of the temporary candidate BSs may be calculated by a distance from the MS. In this event, the BS position threshold may be indicated by a threshold of the distance from the MS. Alternatively, the BS position threshold may be calculated by a distance between the serving BS and the BS (for example, hop count) and may be indicated by a path loss or signal strength between the serving BS and the BS.

The serving BS configures a potential candidate BS list by the temporary candidate BSs within the BS position threshold in step 442 and proceeds to step 446. As a result of the identification, when there are the temporary candidate BSs having position information which is not within the BS position threshold, the serving BS removes the temporary candidate BSs having the position information which is not within the BS position threshold from the candidate BS list in step 444 and proceeds to step 446.

In step 446, the serving BS identifies whether all the candidate BSs included in the candidate BS list are determined to be maintained as the members of the candidate BS list, that is, whether service quality of all the candidate BSs are completely identified through steps 436 to 444. As a result of the identification, when there is a candidate BS of which service quality has not been identified, the serving BS proceeds to step 436. Then, until it is determined as to whether to maintain a next candidate BS as the member of the candidate BS list and thus all the candidate BSs are determined as to whether to be maintained as the members of the candidate BS list, steps 436 to 444 are repeated.

As a result of the identification, when all the candidate BSs are completely determined as to whether to be maintained as the members of the candidate BS list, the serving BS identifies whether a total number of candidate BSs included in the re-configured candidate BS list (hereinafter referred to as a number of re-configured candidate BSs) is larger than or equal to a preset number of member BSs in step 448(*a*) of FIG. 4D. As a result of the identification, when the total number of re-configured candidate BSs is larger than or equal to the number of member BSs, the serving BS selects as many re-configured candidate BSs as the number of member BSs in order starting from highest service quality and determines the selected candidate BSs as targets to receive the member BS negotiation in step 450. The serving BS performs transaction negotiation with the targets to receive the member BS negotiation for the cooperative communication-based cell in step 456, determines candidate BSs having successfully passed through the transaction negotiation as final member BSs in step 462, and proceeds to step 464. The transaction negotiation will be described in detail with reference to FIG. 4E.

As a result of the identification, when the total number of re-configured candidate BSs is smaller than the number of member BSs, the serving BS identifies whether the total number of re-configured candidate BSs is "0" in step 452. As a result of the identification, when the total number of re-configured BSs is not "0", the serving BS selects as many candidate BSs as the number lacking from the BSs included in the potential candidate BS list in order starting from highest service quality and determines the selected candidate BSs as the targets to receive the member BS negotiation in step 454. The serving BS performs the transaction negotiation with the selected targets to receive the member BS negotiation for the cooperative communication-based cell in step 456 and proceeds to step 462.

As a result of the identification, when the total number of re-configured candidate BSs is "0", the serving BS selects candidate BSs corresponding to the number of member BSs from the potential candidate BS list in order starting from highest service quality and determines the selected candidate BSs as the targets to receive the member BS negotiation. The serving BS performs the transaction negotiation with the selected targets to receive the member BS negotiation for the cooperative communication-based cell in step 456 and proceeds to step 462.

In step 462, the serving BS determines candidate BSs having successfully passed through the transaction negotiation as the final member BSs. In step 464, the serving BS performs a member BS update operation of transmitting information on the final member BSs to the MS and the final member BSs.

Figure 4E:
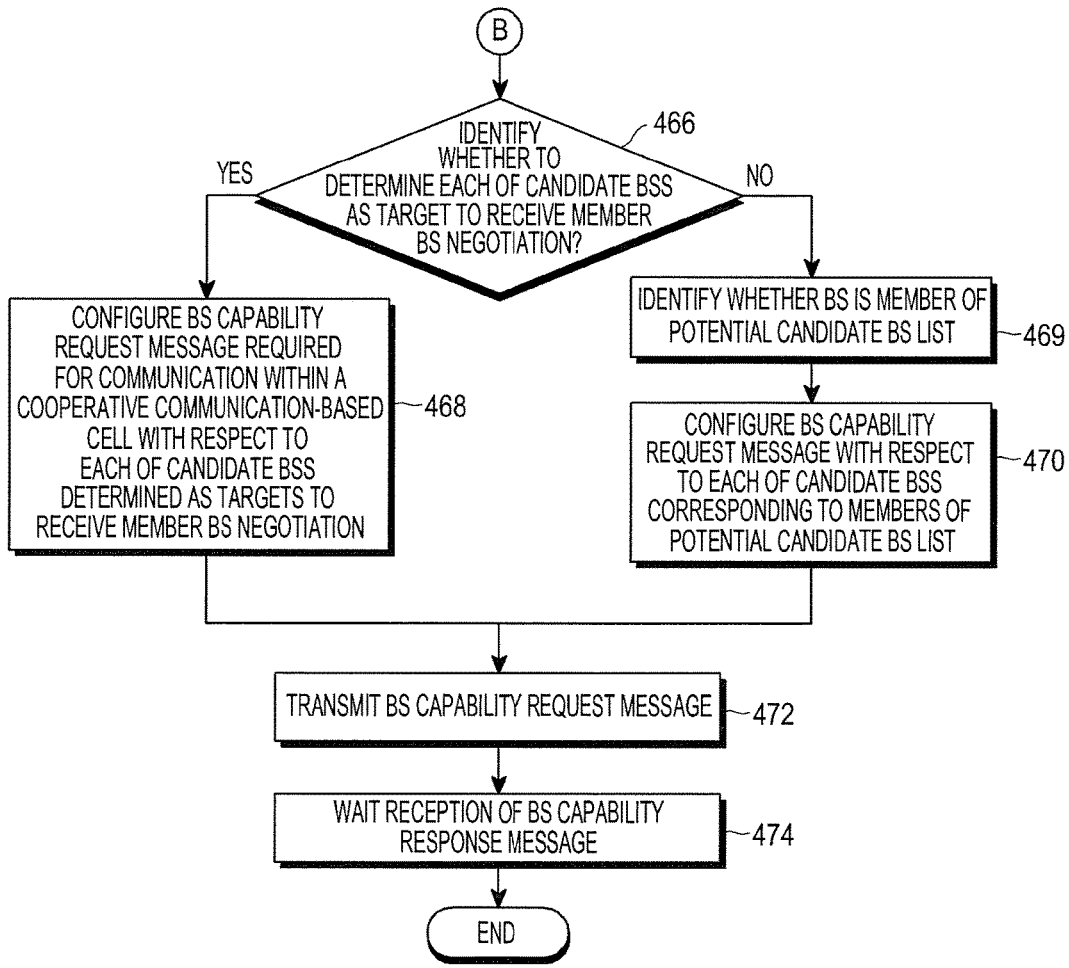
FIG. 4E illustrates an example of a flowchart of a detailed operation for performing a transaction negotiation with a target to receive a member BS negotiation for a cooperative communication-based cell among the operation in which the serving BS determines the member BSs according to an illustrative embodiment of the present disclosure.

FIG. 4E is a flowchart of a detailed operation for performing the transaction negotiation with the targets to receive the member BS negotiation for the cooperative communication-based cell among the operation in which the serving BS determines the member BSs according to an illustrative embodiment of the present disclosure. That is, FIG. 4E is a flowchart of a detailed operation of step 415 (B) of FIG. 4A.

Referring to FIG. 4E, in step 466 (B), the serving BS identifies whether each of the candidate BSs included in the candidate BS list is determined as the target to receive the member BS negotiation. Since the operation of determining the candidate BSs as the target to receive the member BS negotiation overlaps the description of FIGS. 4C and 4D, a detailed description will be omitted herein.

As a result of the identification, for the candidate BSs determined as the targets to receive the member BS negotiation, the serving BS configures a BS capability request message of making a request for BS capability required for communication in the cooperative communication-based cell in step 468 and proceeds to step 472. When the corresponding candidate BS operates as the member BS within the cooperative communication-based cell of the MS, the BS capability request message includes a number of required antennas, required transmission power, required buffer capacity, and required RF chains as the BS capability.

In step 472, the serving BS transmits the BS capability request message of the corresponding BS to each of the candidate BSs determined as the targets to receive the member BS negotiation. In step 474, the serving BS waits to receive a BS capability response message corresponding to the BS capability request message from the corresponding candidate BSs. The BS capability request message includes parameters indicating the BS capability required for servicing the MS, that is, a number of antennas of the BS, currently remaining power, available buffer capacity, cell load, and a number of available RF chains. Meanwhile, as a result of the identification in step 466, for the candidate BSs which are not determined as the targets to receive the member BS negotiation, the serving BS proceeds to step 469. That is, candidate BSs satisfying the BS position threshold among the candidate BSs, which are not determined as the targets to receive the member BS negotiation may be selected as the members of the potential candidate BS list. The potential candidate BS list includes candidate BSs which do not satisfy the service quality threshold but satisfy the BS position threshold among the candidate BSs included in the candidate BS list received from the MS. Further, when the total number of re-configured candidate BSs is "0" as described in step 458 or when the total number of re-configured candidate BSs is smaller than the number of member BSs as described in step 454, the potential candidate BS list stores candidate BSs, which can be additionally selected as the targets to receive the member BS negotiation, corresponding to the number lacking. Accordingly, the serving BS identifies whether the candidate BSs which have not been determined as the targets to receive the member BS negotiation among the candidate BSs in step 466 correspond to the members of the potential candidate BS list in step 469. The serving BS configures the BS capability request message of making a request for the BS capability required for communication in the cooperative communication-based cell only for each of the identified candidate BSs included in the potential candidate BS list in step 470 and proceeds to step 472.

Figure 4F:
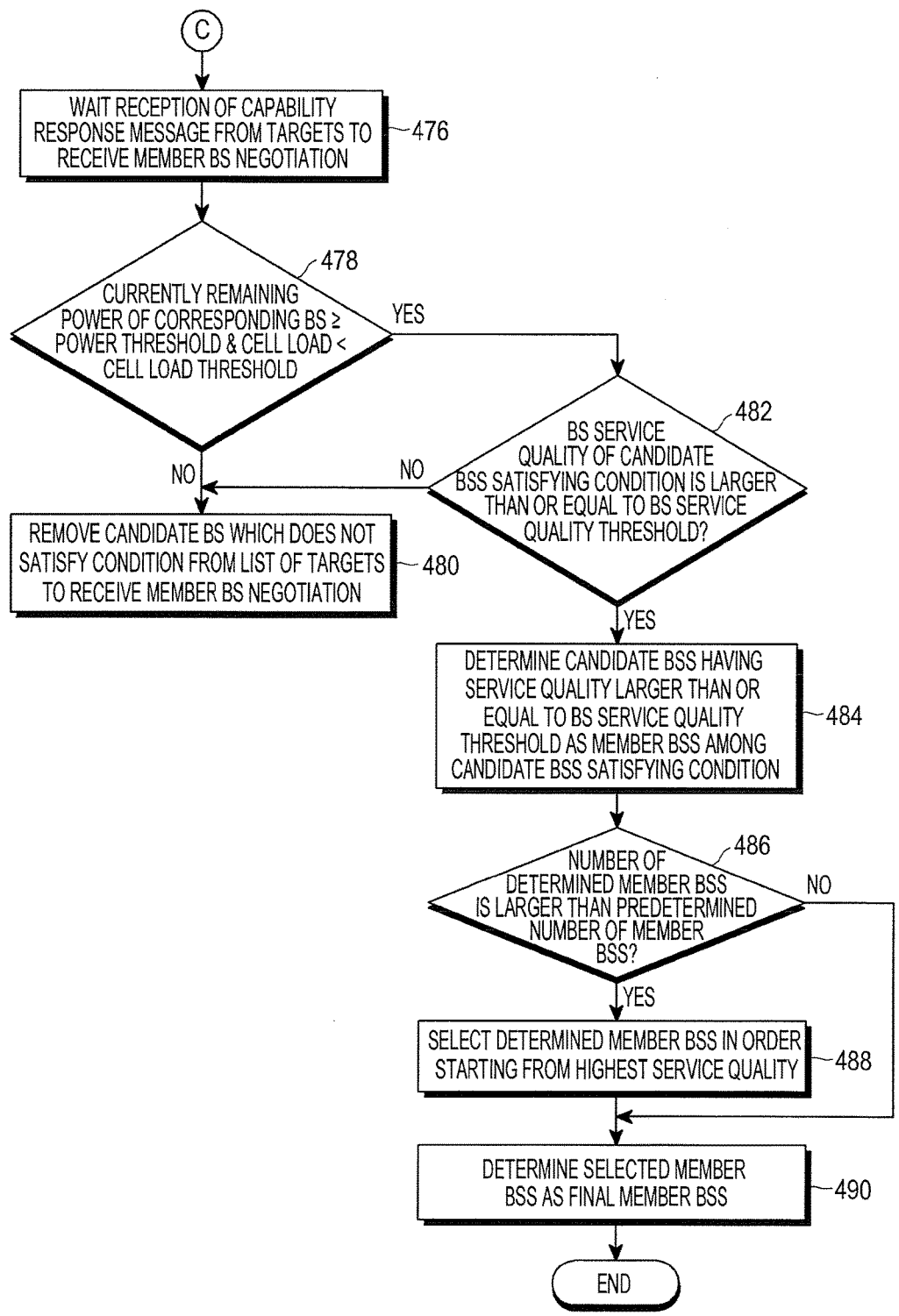
FIG. 4F illustrates an example of a flowchart of a detailed operation for determining a final member BS among the operation in which the serving BS determines the member BSs according to an illustrative embodiment of the present disclosure.

FIG. 4F is an example of a flowchart of a detailed operation for determining the final member BSs among the operation in which the serving BS determines the member BSs according to an illustrative embodiment of the present disclosure. That is, FIG. 4F is a flowchart of a detailed operation of step 420 (C) of FIG. 4A.

Referring to FIG. 4F, in step 476, the serving BS receives a BS capability response message from the targets to receive the member BS negotiation having received the capability request message. The BS capability response message includes parameters indicating the capability of the corresponding candidate BS, that is, a number of antennas of the corresponding BS, currently remaining power, available buffer capacity, cell load, and a number of available RF chains.

In step 478, the serving BS analyzes parameters included in the BS capability response message received from each of the targets to receive the member BS negotiation. For example, the serving BS identifies whether a condition in which the currently remaining power of the corresponding BS is larger than or equal to a predetermined power threshold is satisfied or a condition in which cell load of the corresponding BS is smaller than a cell load threshold is satisfied. The conditions may be set according to a comparison between at least one of the parameters and a threshold corresponding to the parameter as well as the currently remaining power and the cell load.

As a result of the identification, when there is at least one candidate BS which is not included in the conditions, the serving BS removes the candidate BS which is not included in the conditions from a list of the targets to receive the member BS negotiation in step 480.

As a result of the identification, when there is the candidate BS satisfying the conditions, the serving BS identifies whether service quality of the corresponding BS is larger than or equal to a predetermined BS service quality threshold in step 482. Through a result of the identification, the serving BS also removes the candidate BSs having the BS service quality which does not satisfy the BS service quality threshold among the candidate BSs satisfying the conditions from the list of the targets to receive the member BS negotiation in step 408.

When the corresponding candidate BS operates as the member BS within the cooperative communication-based cell of the MS, the BS capability which is the parameter used for identifying the service quality of the BS corresponds to a number of required antennas, required transmission power, required buffer capacity, and required RF chains. The BS position corresponds to a hop count between BSs satisfying latency required within the cooperative-communication-based cell, a corresponding BS position from each of the MS and the serving BS, a path loss between BSs, and strength of a signal received by the serving BS. The MS mobility may be also considered as the parameter indicating the service quality of the candidate BS.

Through a result of the identification, the serving BS determines the candidate BSs having the BS capability satisfying the service quality threshold among the candidate BSs satisfying the conditions as the member BSs in step 484. In step 486, the serving BS identifies whether a total number of determined member BSs is larger than a predetermined number of member BSs. As a result of the identification, when the total number of determined member BSs is smaller than or equal to the number of member BSs, the serving BS proceeds to step 490.

As a result of the identification, when the total number of determined member BSs is larger than the predetermined number of member BSs, the serving BS selects only as many member BSs as the predetermined number of member BSs from the determined member BSs in order starting from highest service quality in step 488. In step 490, the serving BS determines the selected member BSs as the final member BSs.

Figure 5:
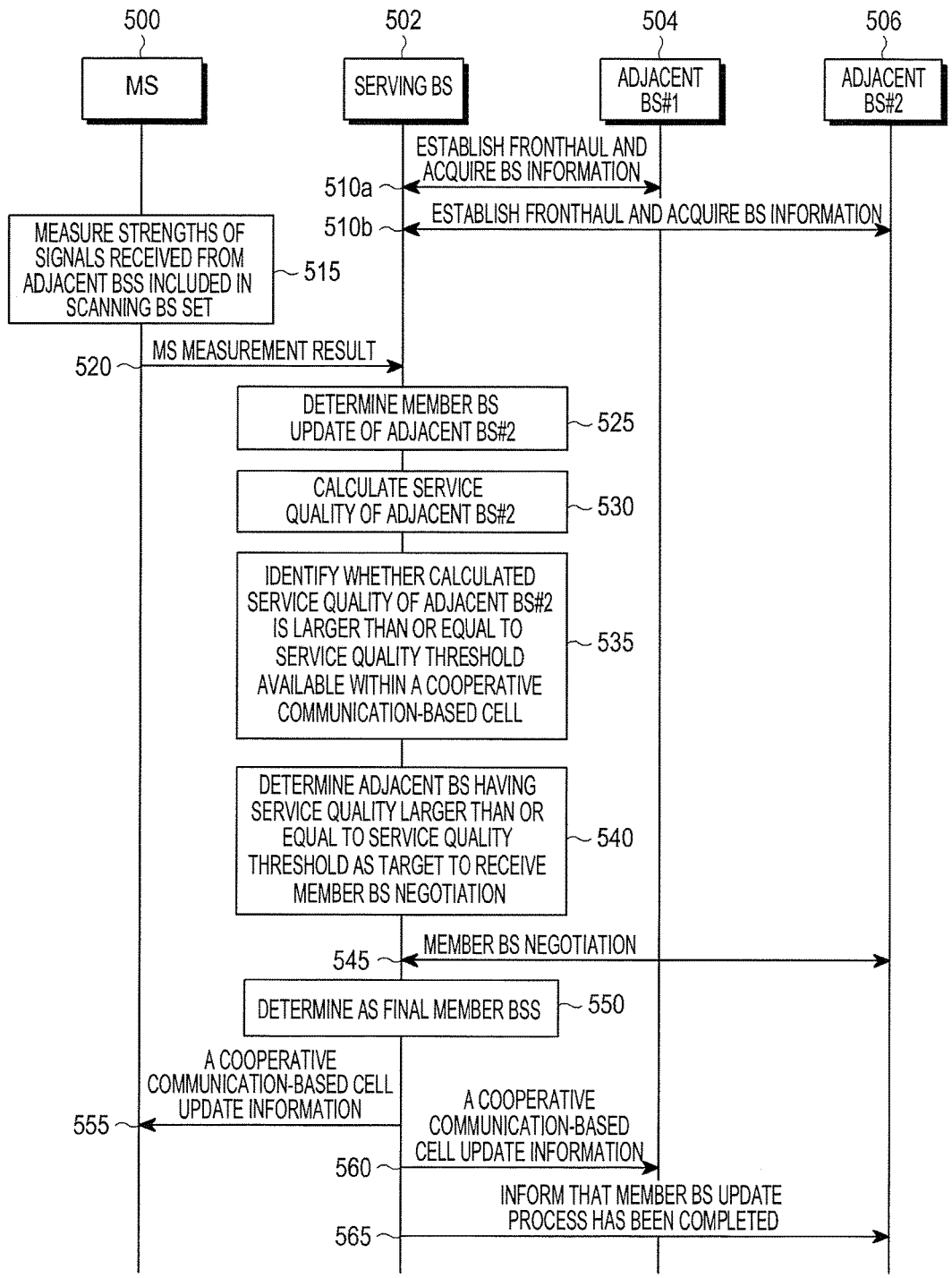
FIG. 5 illustrates an example of a flow diagram of an overall operation for updating member BSs included in a cooperative communication-based cell of an MS according to an illustrative embodiment of the present disclosure.

FIG. 5 is an example of a flow diagram illustrating an overall operation for updating the member BSs configuring the cooperative communication-based cell of the MS according to an illustrative embodiment of the present disclosure. For the convenience of description, it is assumed that a serving BS 502 configuring the cooperative communication-based cell of an MS 500 updates adjacent BS#2 506 in a state where the serving BS 502 finally determines adjacent BS#1 504 as a member BS, that is, a cooperative BS like in FIG. 2.

Referring to FIG. 5, in steps 510a to 510b, the serving BS 502 performs a fronthaul establishment process for a communication link with each of the adjacent BSs of the serving BS 502, for example, adjacent BS#1 504 and adjacent BS#2 506. The fronthaul establishment process is performed before the cooperative communication-based cell of the MS 500 is configured and updated. Through the fronthaul establishment process, the serving BS 502 has acquired BS information of adjacent BS#1 504 and adjacent BS#2 506. Since the BS information indicates the corresponding BS position and basic capability and a detailed description thereof overlaps the description in FIG. 2, the detailed description thereof will be omitted herein.

The MS 500 measures strength of a signal received from each of the adjacent BSs included in the scanning BS set in step 515 and transmits information on the measured strength of the signal to the serving BS 502 as a result of the MS measurement in step 520.

Thereafter, the serving BS 502 identifies that one of signal strengths acquired from the result of the MS measurement, for example, signal strength of adjacent BS#2 506 exceeds a minimum signal strength threshold for serving the MS in step 525. Then, the serving BS 502 determines a member BS update for adding adjacent BS#2 506 as the member BS configuring the cooperative communication-based cell of the MS 500. Although it has been described as an example that only adjacent BS#2 506 is updated as a new member BS, a number of member BSs to be updated can be changed.

In step 530, the serving BS 502 calculates service quality by using the BS information of adjacent BS#2 506 acquired during the fronthaul establishment process of step 510b.

In step 535, the serving BS 502 identifies whether the calculated service quality of adjacent BS#2 506 is larger than or equal to a service quality threshold available within the cooperative communication-based cell in step 535. In step 540, the serving BS 502 determines, for example, adjacent BS#2 506 having the service quality larger than or equal to the service quality threshold as a target to receive a member BS negotiation.

Then, in step 545, the serving BS 502 performs the member BS negotiation with adjacent BS#2 506. When the member BS negotiation is successfully performed, the serving BS 502 determines adjacent BS#2 506 as a new member BS in step 550. In the member BS negotiation, the serving BS 502 makes, to adjacent BS#2 506, a request for a BS capability state required when adjacent BS#2 506 operates as the member BS within the cooperative communication-based cell of the MS 500. Further, when the serving BS 506 receives a response satisfying the required BS capability state, the member BS negotiation is successfully performed.

In step 555, the serving BS 502 transmits cooperative communication-based cell update information informing that adjacent BS#2 506 has been determined as the new member BS to the MS 500. The MS 500 having received the cooperative communication-based cell update information stores adjacent BS#2 506 in a cooperative communication-based cell member list managed by the MS 500 as a new cooperative BS. In step 560, the serving BS 502 transmits the cooperative communication-based cell update information to adjacent BS#1 504 corresponding to the existing member BS.

In step 565, the serving BS 502 informs adjacent BS#2 506 that the member BS update process has been completed.

Meanwhile, although it has been described in FIG. 5 as an example that the member BS update process is performed by adding a new cooperative BS, the member BS update process according to an embodiment of the present disclosure may be expanded to a case where the existing member BS is removed or the serving BS is changed to the existing or new member BS.

Hereinafter, in another illustrative embodiment of the present disclosure, the serving BS transmits information on primarily filtered adjacent BSs to the MS based on the BS information of each of the adjacent BSs having established the fronthaul. Then, the MS measures strengths of signals received from only the filtered adjacent BSs instead of the adjacent BSs included in the existing scanning BS set, configures a candidate BS list by the selected candidate BSs based on a result of the measurement, and transmits the configured candidate BS list to the serving BS. Thereafter, the serving BS selects BSs to receive the member negotiation from the candidate BSs based on the received signal strength measurement of the MS and finally determines the member BSs through the transaction negotiation for the cooperative communication-based cell.

Figure 6:
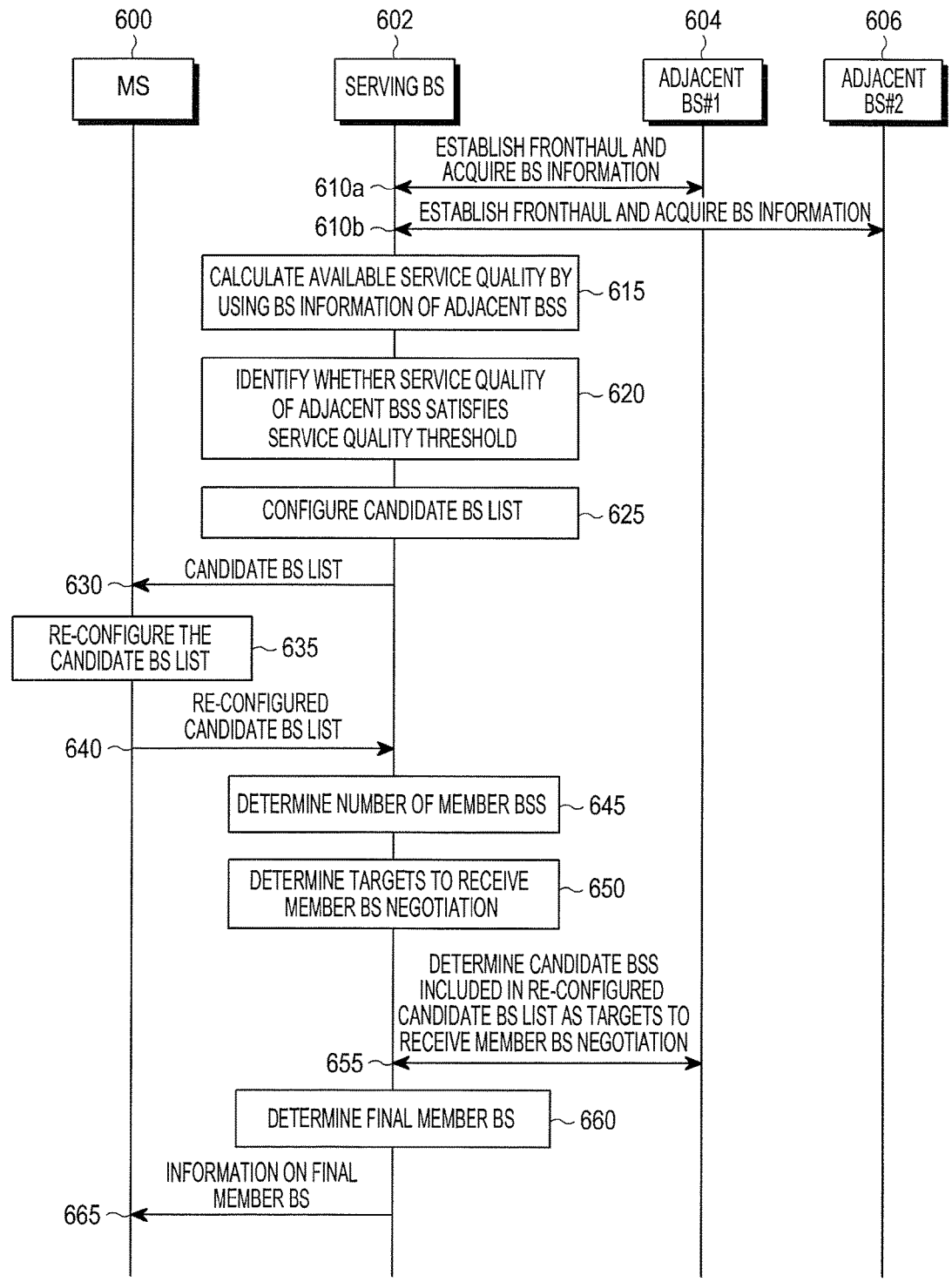
FIG. 6 illustrates an example of a flowchart of an overall operation in which a serving BS determines member BSs according to an illustrative embodiment of the present disclosure.

FIG. 6 is a flowchart of an overall operation in which the serving BS determines the member BSs according to an illustrative embodiment of the present disclosure. For the convenience of description, a serving BS 602 configuring the cooperative communication-based cell of an MS 600 has been already determined and adjacent BSs managed by the serving BS 602 are, for example, two BSs including adjacent BS#1 604 and BS#2 606. However, the number of adjacent BSs managed by the serving BS may be different from the example of FIG. 6 in practice.

Referring to FIG. 6, in steps 610a to 610b, the serving BS 602 managing the cooperative communication-based cell of the MS 600 has performed a fronthaul establishment process with adjacent BSs of the serving BS 602, for example, adjacent BS#1 604 and adjacent BS#2 606 to acquire BS information of the corresponding adjacent BSs in advance from adjacent BS#1 604 and adjacent BS#2 606. Since the BS information of the adjacent BS indicates the corresponding BS position and basic capability and definitions thereof are identical to those in FIG. 2, a detailed description thereof will be omitted.

In step 615, the serving BS 602 calculates service quality which can be used within the cooperative communication-based cell by using the BS information acquired from each of adjacent BS#1 604 and adjacent BS#2 606. In step 620, the serving BS 602 identifies whether the service quality calculated for each of the adjacent BSs, that is, adjacent BS#1 604 and adjacent BS#2 606 is larger than or equal to a predetermined service quality threshold. The service quality and the service quality threshold may be set equally to the embodiments discussed above with regard to FIGS. 2-5 or set to have a range wider than that of the embodiments discussed above with regard to FIGS. 2-5.

In step 625, the serving BS 602 configures a candidate BS list by adjacent BSs having service quality larger than or equal to the service quality threshold as a result of the identification. In step 630, the serving BS 602 transmits the candidate BS list to the MS 600.

Thereafter, the MS 600 having received the candidate BS list measures strengths of signals received from the candidate BSs included in the candidate BS list in step 635. The MS 600 re-configures the candidate BS list by candidate BSs satisfying a predetermined candidate BS determination condition among the candidate BSs included in the candidate BS list based on the measured signal strengths. In step 640, the MS 600 transmits the re-configured candidate BS list to the serving BS 602. The re-configured candidate BS list may be transmitted to the serving BS 602 through, for example, an access request message. For example, it is assumed that the candidate BS determination condition of the MS 600 is set equally to the embodiments discussed above with regard to FIGS. 2-5.

Then, in step 645, the serving BS 602 determines a number of member BSs included in the cooperative communication-based cell of the MS 600. The number of member BSs is defined as a total number of cooperative BSs except for the serving BS 602. The number of member BSs corresponds to a number of BSs which does not increase complexity of the operation of the cooperative communication-based cell and maximizes capability of throughput of the cooperative communication-based cell and also corresponds to a number of BSs which can be supported by the MS 600.

In step 650, the serving BS 602 determines candidate BSs included in the re-configured BS list as targets to receive a member BS negotiation. In step 655, the serving BS 602 performs the member BS negotiation with the determined targets to receive the member BS negotiation in step 655. For example, it is assumed that adjacent BS#1 604 is one of the candidate BSs. When the member BS negotiation with adjacent BS#1 601 is successfully performed, the serving BS 602 determines adjacent BS#1 604 as a final member BS in step 660. In the member BS negotiation, the serving BS 602 makes, to adjacent BS#1 604, a request for a BS capability state required when adjacent BS#1 604 operates as the member BS within the cooperative communication-based cell of the MS 600. For example, the BS capability state includes a channel state between the corresponding BS and the serving BS 602 (for example, RSSI, path loss and the like), a number of antennas of the corresponding BS, currently remaining power, available buffer capacity, cell load, and a number of available RF chains. Further, when the serving BS 604 receives a response satisfying the required BS capability state from adjacent BS#1 604, the member BS negotiation is successfully performed.

In step 655, the serving BS 602 transmits information related to the final member BS to the MS 600. The information related to the final member BS includes information informing that adjacent BS#1 604 has been determined as the final member BS and information on the final member BS, that is, indication information of adjacent BS#1 604. The information may be transmitted through an access response to the access request. Although it has been described that the final member BS is only adjacent BS#1 604, if a number of final member BSs is plural, the indication information can be configured in a form of a list of the plurality of final member BSs.

As described above, the operation for determining the member BS according to this illustrative embodiment of the present disclosure which is performed through steps 610a to 625 and steps 645 to 660 will be described in detail with reference to FIGS. 7A to 7F.

Figure 7A:
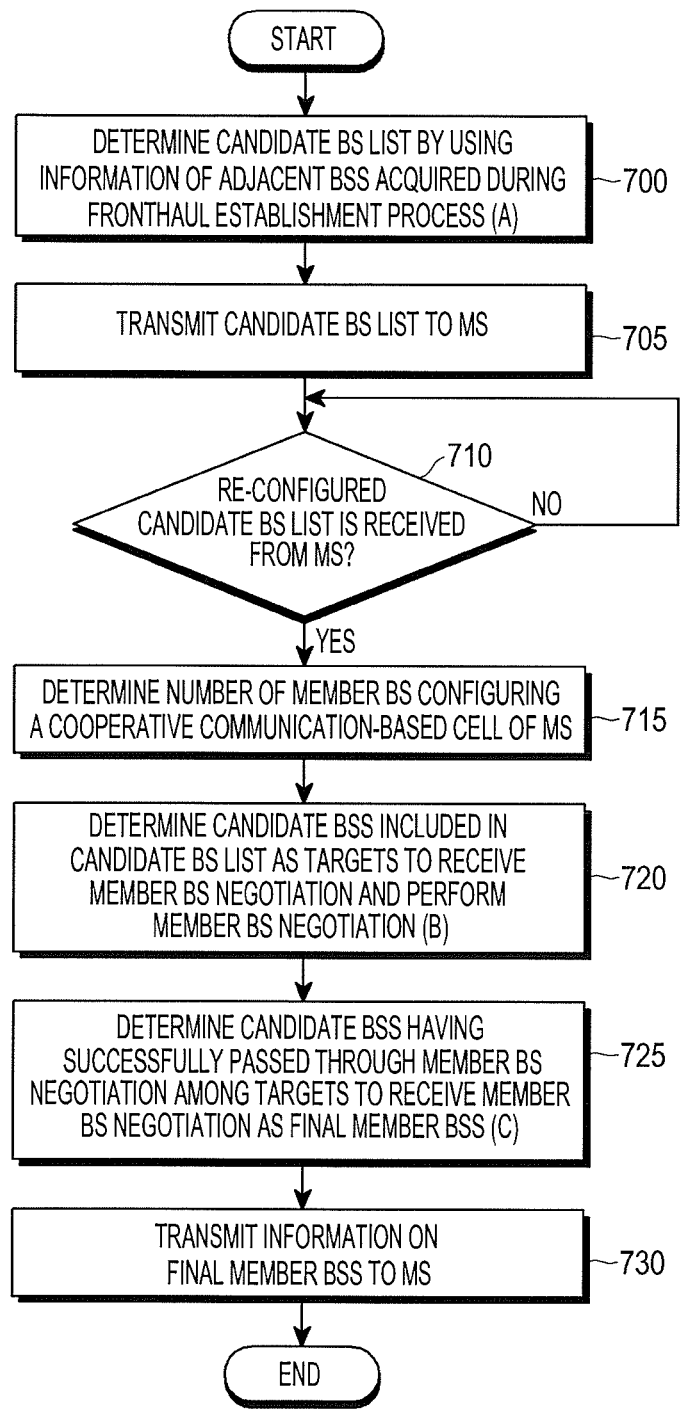
FIG. 7A illustrates an example of a flowchart of an overall operation in which a serving BS determines member BSs according to an illustrative embodiment of the present disclosure.

FIG. 7A illustrates an example of a flowchart of an overall operation in which the serving BS determines the member BSs according to an illustrative embodiment of the present disclosure.

Referring to FIG. 7A, in step 700, the serving BS determines a candidate BS list by adjacent BSs having completed a fronthaul establishment with the serving BS by using information on the adjacent BSs acquired during a fronthaul establishment process. Since the BS information of the adjacent BSs indicates the corresponding BS position and basic capability and definitions thereof are identical to those in FIG. 2, a detailed description thereof will be omitted. The serving BS calculates service quality which can be used within the cooperative communication-based cell by using information having a static characteristic among the BS position information and basic capability of the adjacent BSs. The basic capability of the BS having the static characteristic corresponds to, for example, system information which is not changed in spite of a time change among the capability information of the BS. In this event, the serving BS identifies whether the calculated service quality of the adjacent BSs is larger than or equal to a predetermined service quality threshold. Through the identification of the service quality, the serving BS inserts adjacent BSs having the service quality larger than or equal to the service quality threshold into the candidate BS list. In step 705, the serving BS transmits the candidate BS list to the MS.

In step 710, the serving BS waits for a determination on whether to receive the candidate BS list from the MS. As a result of the waiting, when the candidate BS list is not received, the serving BS continuously maintains a standby state.

As a result of the waiting, when the candidate BS list is received, the serving BS determines a number of member BSs included in the cooperative communication-based cell of the MS in step 715. The number of member BSs is defined as a total number of cooperative BSs except for the serving BS. The number of member BSs corresponds to a number of BSs which does not increase complexity of the operation of the cooperative communication-based cell and maximizes capability of throughput of the cooperative communication-based cell and also corresponds to a number of BSs which can be supported by the MS 200. In step 720 (B), the serving BS determines the candidate BSs included in the candidate BS list as targets to receive the member BS negotiation and performs the member BS negotiation with the determined targets to receive the member BS negotiation. In the member BS negotiation, the serving BS 602 makes, to the BS corresponding to the target to receive the corresponding member BS negotiation, a request for a BS capability state required when the BS operates as the member BS within the cooperative communication-based cell of the MS. For example, the BS capability state includes a channel state between the corresponding BS and the serving BS (for example, RSSI, path loss and the like), a number of antennas of the corresponding BS, currently remaining power, available buffer capacity, cell load, and a number of available RF chains. Further, when the serving BS receives a response satisfying the required BS capability state from adjacent BS#1 204, the member BS negotiation is successfully performed.

In step 725 (C), the serving BS determines the candidate BSs having successfully passed through the member BS negotiation among the targets to receive the member BS negotiation as final member BSs. In step 730, the serving BS transmits information related to the determined final member BSs to the MS.

The operation for determining the member BS according to this illustrative embodiment of the present disclosure performed through steps 720 to 730 as described above will be described in more detail with reference to FIGS. 7B to 7F.

Figure 7B:
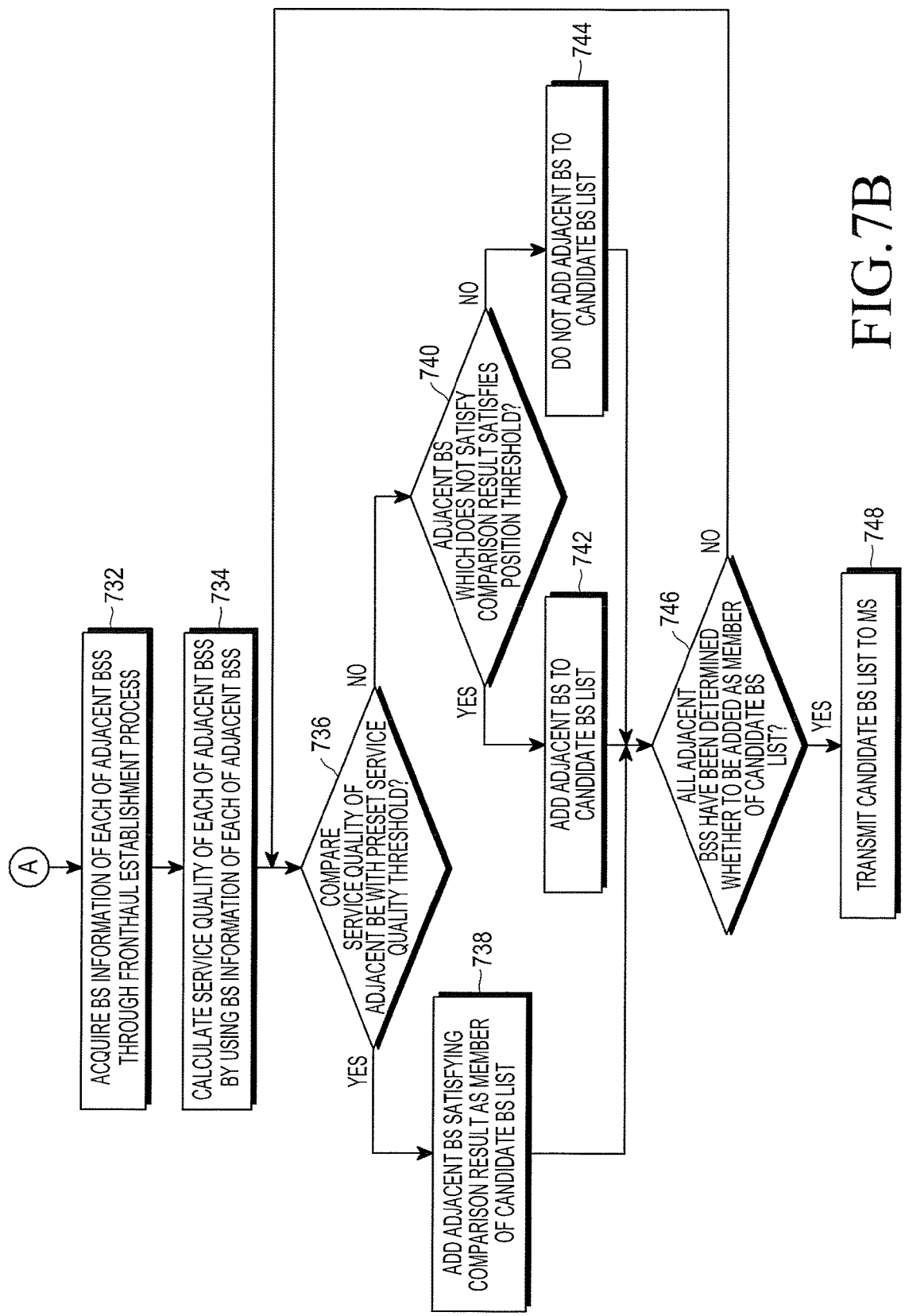
FIG. 7B illustrates an example of a flowchart of a detailed operation for determining a candidate BS list among the overall operation in which the serving BS determines the member BSs according to an illustrative embodiment of the present disclosure.

FIG. 7B illustrates an example of a flowchart of a detailed operation for determining the candidate BS list among the overall operation in which the serving BS determines the member BSs according to an illustrative embodiment of the present disclosure. That is, FIG. 7B is a flowchart of a detailed operation of step 700 (A) of FIG. 7A.

Referring to FIG. 7B, in step 732, the serving BS acquires in advance BS information of each of the adjacent BSs during the fronthaul establishment process with each of the adjacent BSs. In step 734, the serving BS calculates service quality of each of the adjacent BSs by using the BS information of each of the adjacent BSs. The service quality corresponds to, for example, throughput, QoE, QoS and the like required for communication with the cooperative communication-based cell. The service quality is determined through a parameter indicating the BS capability and a parameter indicating the BS position. The BS capability includes a system parameter of the corresponding adjacent BS and corresponds to information which is not changed in spite of a time change, for example, maximum buffer capacity, a maximum number of RF chains, a maximum number of antennas, and maximum transmission power. The BS position corresponds to a hop count between BSs satisfying latency required within the cooperative-communication-based cell, a corresponding BS position from each of the MS and the serving BS, a path loss between BSs, and strength of a signal received by the serving BS.

In step 736, the serving BS compares service quality of one of the adjacent BSs having fronthaul establishment with the serving BS with a preset threshold service quality threshold. As a result of the comparison, when the service quality of the adjacent BS is larger than or equal to the service quality threshold, the serving BS adds the adjacent BS as the member of the candidate BS list in step 738 and proceeds to step 746. As a result of the comparison, when the service quality of the adjacent BS is smaller than the service quality threshold, the serving BS identifies whether position information of the adjacent BS satisfies a BS position threshold in step 740. As a result of the identification, when the position information of the adjacent BS is within the BS position threshold, the serving BS proceeds to step 742. More specifically, the position information of the adjacent BS may be calculated by a distance from the MS. In this event, the BS position threshold may be indicated by a threshold of the distance from the MS. Alternatively, the position information of the adjacent BS may be calculated by a distance (for example, hop count) between the serving BS and the adjacent BS or calculated by path load or signal strength between the serving BS and the adjacent BS. The serving BS adds the adjacent BS as the member of the candidate BS list in step 742 and proceeds to step 746. As a result of the identification, when the adjacent BS is not located within the BS position threshold, the serving BS does not add the adjacent BS to the candidate BS list in step 744 and proceeds to step 746.

In step 746, the serving BS identifies whether it is determined that all the adjacent BSs having established the fronthaul with the serving BS are added as the member of the candidate BS list through steps 736 to 744. As a result of the identification, when there is an adjacent BS which has not been determined as to whether to be added as the member of the candidate BS list, the serving BS proceeds to step 736. Then, the serving BS repeats steps 736 to 744 until the next adjacent BS is determined as to whether to be added as the member of the candidate BS list and then all the adjacent BSs are determined as to whether to be added as the member of the candidate BS list.

As a result of the identification, when all the adjacent BSs are determined as to whether to be added as the member of the candidate BS list, the serving BS transmits the candidate BS list configured as described above to the MS in step 748.

Figure 7C:
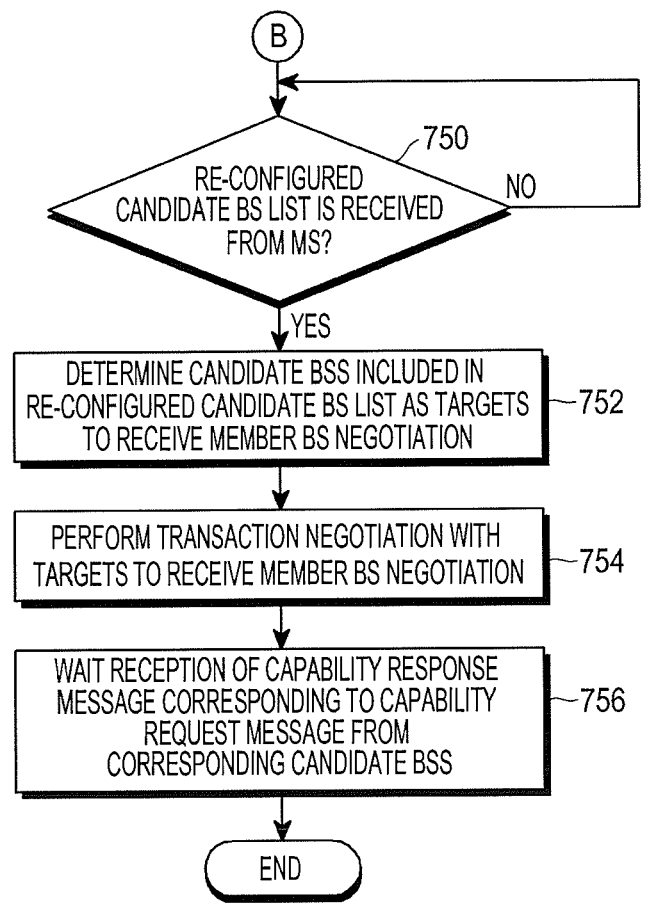
FIG. 7C illustrates an example of a flowchart of a detailed operation for performing a member BS negotiation among the operation in which the serving BS determines the member BSs according to an illustrative embodiment of the present disclosure.

FIG. 7C illustrates an example of a flowchart of a detailed operation for performing the member BS negotiation among the operation in which the serving BS determines the member BSs according to an illustrative embodiment of the present disclosure. That is, FIG. 7C is a flowchart of a detailed operation of step 720 (B) of FIG. 7A.

Referring to FIG. 7C, the serving BS waits for a determination on whether to receive the re-configured candidate BS list from the MS in step 750. As a result of the waiting, when the re-configured candidate BS list is not received, the serving BS waits until the re-configured candidate BS list is received. The re-configured candidate BS list is made by selecting candidate BSs satisfying the candidate BS determination condition of the MS from the candidate BSs included in the candidate BS list which the MS receives from the serving BS. The re-configured candidate BS list will be described in detail with reference to a description of operations of the MS in FIG. 8.

As a result of the identification, when the re-configured candidate BS list is received, the serving BS determines the candidate BSs included in the re-configured candidate BS list as targets to receive the member BS negotiation in step 752. The re-configured candidate BS list is determined by candidate BSs satisfying the candidate BS determination condition by the MS. It is assumed that the candidate BS determination condition is set equally to the embodiments discussed above with regard to FIGS. 2-5.

In step 754, the serving BS performs the transaction negotiation with the targets to receive the member BS negotiation in step 754. Specifically, the serving BS configures a BS capability request message of making a request for the BS capability of the corresponding BS to each of the candidate BSs determined as the targets to receive the member BS negotiation. When the corresponding candidate BS operates as the member BS within the cooperative communication-based cell of the MS, the BS capability request message includes a number of required antennas, required transmission power, required buffer capacity, and required RF chains as the BS capability.

In step 756, the serving BS waits to receive a BS capability response message corresponding to the BS capability request message from the corresponding candidate BSs. The BS capability response message includes parameters indicating the capability of the corresponding candidate BS, that is, a number of antennas of the corresponding BS, currently remaining power, available buffer capacity, cell load, and a number of available RF chains.

Figure 7D:
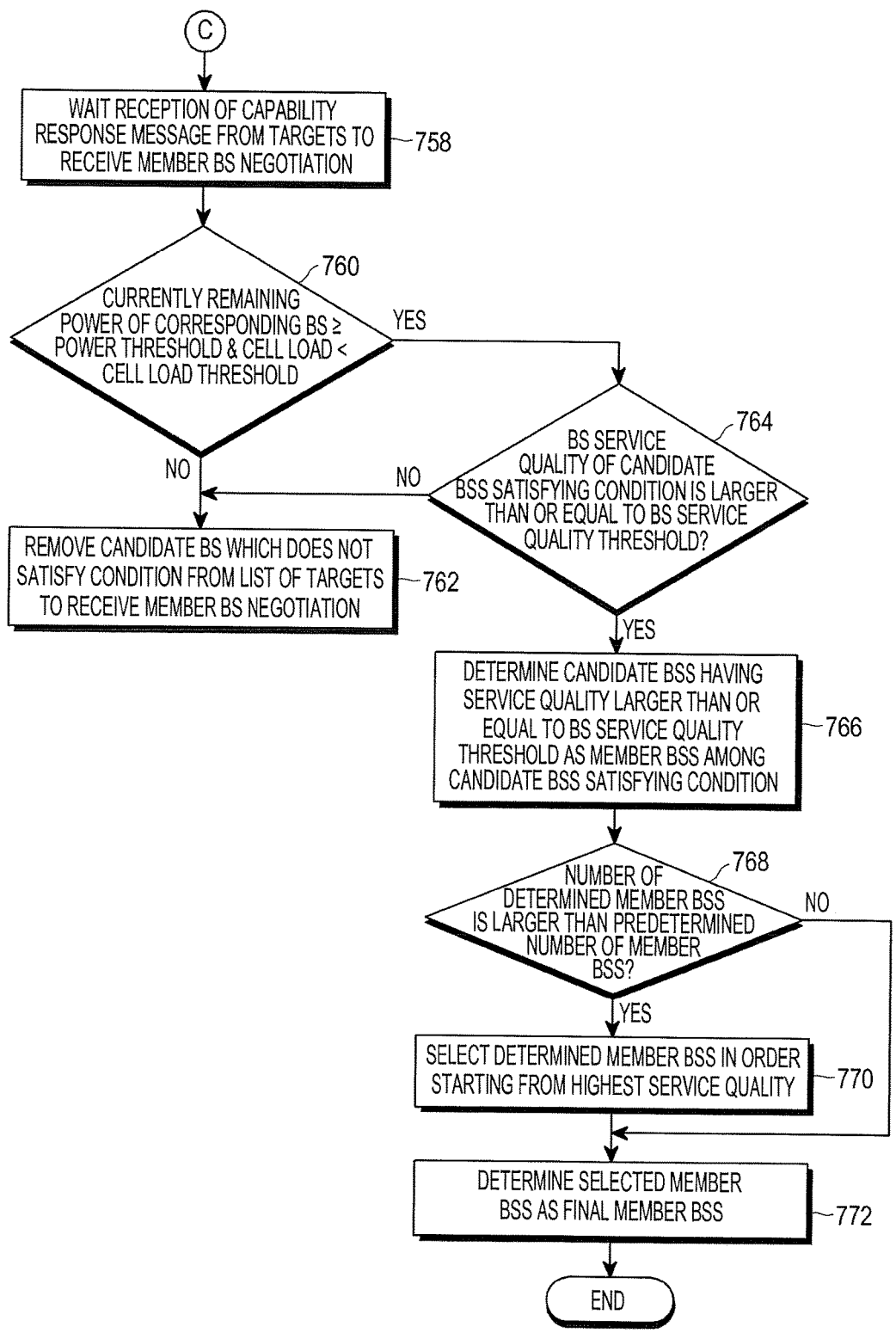
FIG. 7D illustrates an example of a flowchart of a detailed operation for determining a final member BS among the operation in which the serving BS determines the member BSs according to an illustrative embodiment of the present disclosure.

FIG. 7D is an example of a flowchart of a detailed operation for determining the final member BS among the operation in which the serving BS determines the member BSs according to an illustrative embodiment of the present disclosure. That is, FIG. 7D is a flowchart of a detailed operation of step 725 (C) of FIG. 7A.

Referring to FIG. 7D, in step 758, the serving BS receives a BS capability response message from the targets to receive the member BS negotiation having received the BS capability request message. The targets to receive the member BS negotiation correspond to candidate BSs included in the re-configured candidate BS list received from the MS. The BS capability response message includes parameters indicating the capability of the corresponding candidate BS, that is, a number of antennas of the corresponding BS, currently remaining power, available buffer capacity, cell load, and a number of available RF chains.

In step 760, the serving BS analyzes parameters included in the BS capability response message received from each of the targets to receive the member BS negotiation. For example, the serving BS identifies whether a condition in which the currently remaining power of the corresponding BS is larger than or equal to a predetermined power threshold is satisfied or a condition in which cell load of the corresponding BS is smaller than a cell load threshold is satisfied. The conditions may be set according to a comparison between at least one of the parameters and a threshold corresponding to the parameter as well as the currently remaining power and the cell load. As a result of the identification, when there is at least one candidate BS which is not included in the conditions, the serving BS removes the candidate BS which is not included in the conditions from a list of the targets to receive the member BS negotiation in step 762.

As a result of the identification, when there is the candidate BS satisfying the conditions, the serving BS identifies whether service quality of the corresponding BS is larger than or equal to a predetermined BS service quality threshold in step 764. Through a result of the identification, the serving BS also removes the candidate BSs having the BS service quality which does not satisfy the BS service quality threshold among the candidate BSs satisfying the conditions from the list of the targets to receive the member BS negotiation in step 762.

When the corresponding candidate BS operates as the member BS within the cooperative communication-based cell of the MS, the BS capability which is the parameter used for identifying the service quality of the BS corresponds to a number of required antennas, required transmission power, required buffer capacity, and required RF chains. The BS position corresponds to a hop count between BSs satisfying latency required within the cooperative-communication-based cell, a corresponding BS position from each of the MS and the serving BS, a path loss between BSs, and strength of a signal received by the serving BS. The MS mobility may be also considered as the parameter indicating the service quality of the candidate BS. Through a result of the identification, the serving BS determines the candidate BSs having the BS capability satisfying the service quality threshold among the candidate BSs satisfying the conditions as the member BSs in step 766. In step 768, the serving BS identifies whether a total number of determined member BSs is larger than a predetermined number of member BSs. As a result of the identification, when the total number of determined member BSs is smaller than or equal to the number of member BSs, the serving BS proceeds to step 772.

As a result of the identification, when the total number of determined member BSs is larger than the predetermined number of member BSs, the serving BS selects only as many member BSs as the predetermined number of member BSs from the determined member BSs in order starting from highest service quality in step 770. In step 772, the serving BS determines the selected member BSs as the final member BSs.

Figure 8:
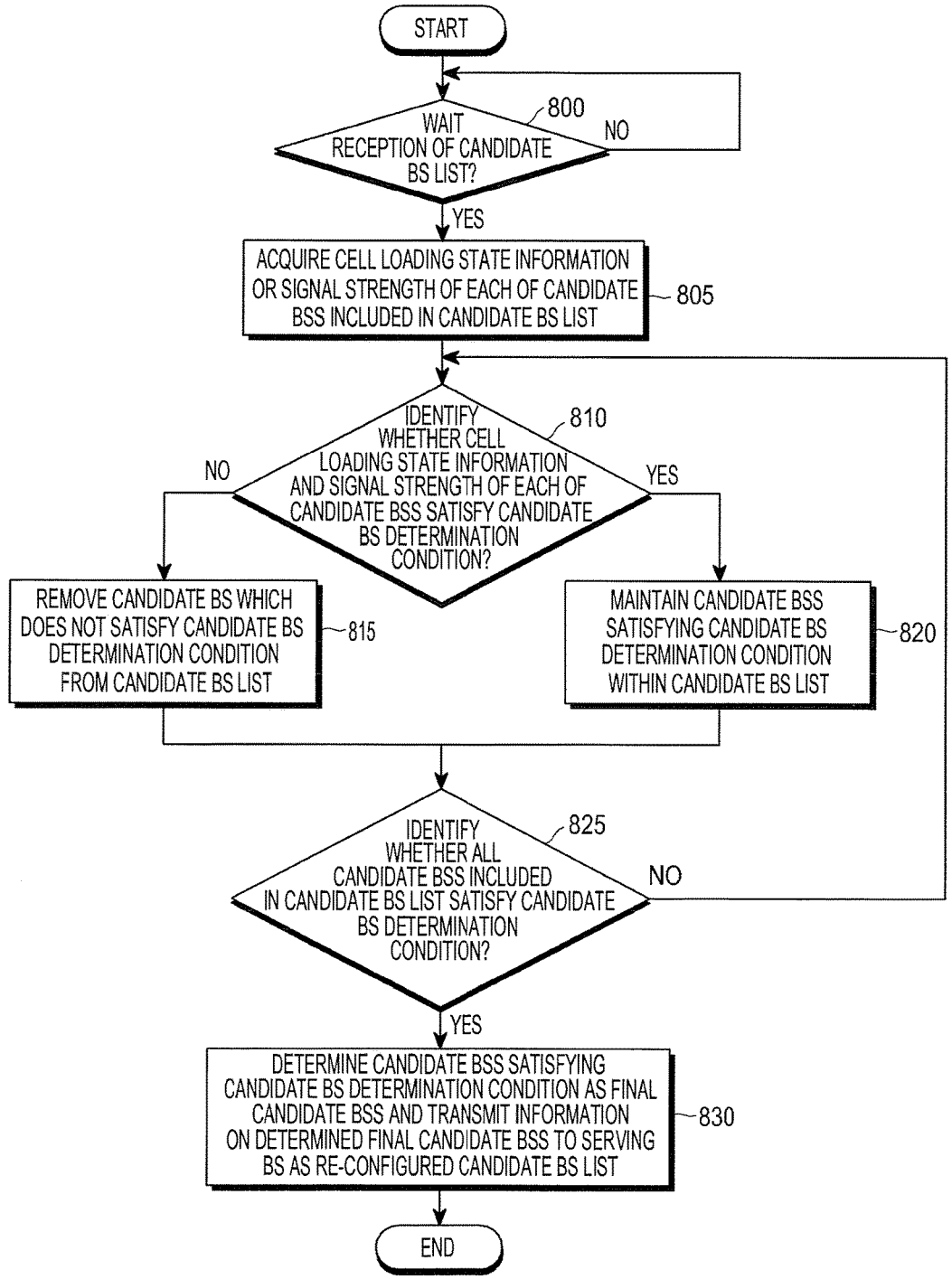
FIG. 8 illustrates an example of a flowchart of operations of an MS according to an illustrative embodiment of the present disclosure.

FIG. 8 illustrates an example of a flowchart of the operation of the MS according to an illustrative embodiment of the present disclosure.

Referring to FIG. 8, in step 800, the MS waits until the candidate BS list is received from the serving BS. The serving BS configures the candidate BS list by adjacent BSs having service quality larger than or equal to a service quality threshold through steps 610a to 625 of FIG. 6.

In step 805, the MS acquires cell loading state information or signal strength from each of the candidate BSs included in the candidate BS list. In step 810, the MS identifies whether the cell loading state information and the signal strength of each of the candidate BSs satisfies the candidate BS determination condition. For example, it is assumed that the candidate BS determination condition is set equally to the embodiments discussed above with regard to FIGS. 2-5.

Through a result of the identification, the MS removes candidate BSs which do not satisfy the candidate BS determination condition from the candidate BS list in step 815. Through a result of the identification, the MS maintains candidate BSs satisfying the candidate BS determination condition within the candidate BS list in step 820.

In step 825, the MS identifies whether all the candidate BSs included in the candidate BS list are determined as to satisfy the candidate BS determination condition. As a result of the identification, when there is a candidate BS which has not been identified as to whether it satisfies the candidate BS determination condition, the MS returns to step 810 and identifies whether a next candidate BS satisfies the candidate BS determination condition.

As a result of the identification, when all the candidate BSs are identified as to whether they satisfy the candidate BS determination condition, the MS determines the candidate BSs satisfying the candidate BS determination condition as the final candidate BSs in step 830 and transmits information on the determined final candidate BSs to the serving BS as the re-configured candidate BS list. The information on the re-configured candidate BSs may be transmitted through, for example, an access request message.

Figure 9:
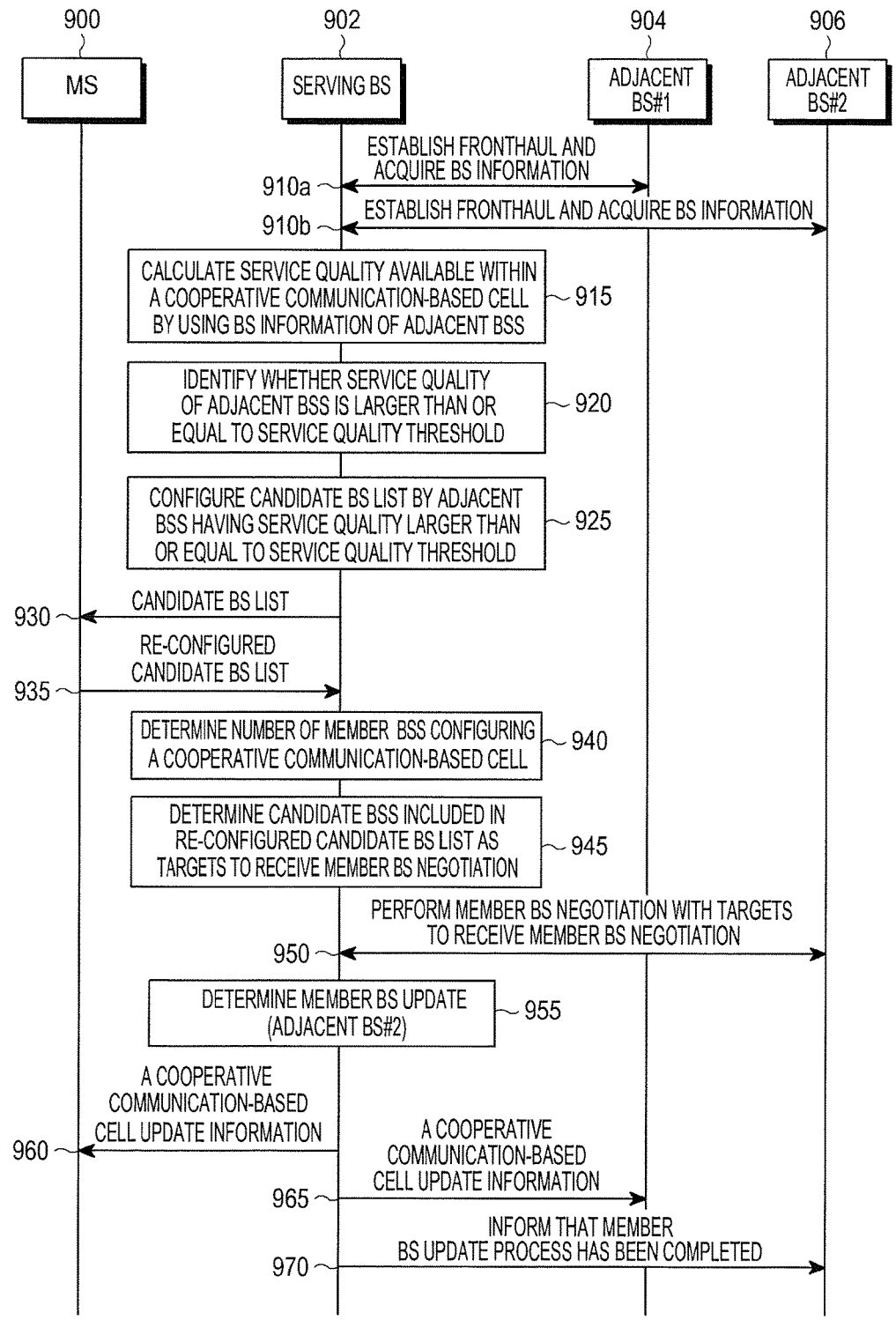
FIG. 9 illustrates an example of a flow diagram of an overall operation for updating member BSs included in a cooperative communication-based cell of an MS according to an illustrative embodiment of the present disclosure.

FIG. 9 illustrates an example of a flow diagram of an overall operation for updating the member BSs configuring the cooperative communication-based cell of the MS according to an illustrative embodiment of the present disclosure. For the convenience of description, it is assumed that a serving BS 902 configuring the cooperative communication-based cell of an MS 900 updates adjacent BS#2 906 in a state where the serving BS 902 finally determines adjacent BS#1 904 as a member BS, that is, a cooperative BS.

Referring to FIG. 9, in steps 910a to 910b, the serving BS 902 performs a fronthaul establishment process for a communication link with each of the adjacent BSs of the serving BS 902, for example, adjacent BS#1 904 and adjacent BS#2 906. The fronthaul establishment process is performed before the cooperative communication-based cell of the MS 900 is configured and updated. It is assumed that the serving BS 902 has acquired BS information of adjacent BS#1 904 and adjacent BS#2 906 through the fronthaul establishment process. Since the BS information indicates the corresponding BS position and basic capability and a detailed description thereof overlaps the description in FIG. 2, the detailed description thereof will be omitted herein.

In step 915, the serving BS 902 calculates service quality which can be used within the cooperative communication-based cell by using the BS information acquired from each of adjacent BS#1 904 and adjacent BS#2 906. In step 920, the serving BS 902 identifies whether the service quality calculated for each of the adjacent BSs, that is, adjacent BS#1 904 and adjacent BS#2 906 is larger than or equal to a predetermined service quality threshold. The service quality and the service quality threshold may be set equally to the embodiments discussed above with regard to FIGS. 2-5 or set to have a range wider than that of the embodiments discussed above with regard to FIGS. 2-5.

In step 925, the serving BS 902 configures a candidate BS list by adjacent BSs having service quality larger than or equal to the service quality threshold as a result of the identification. In step 930, the serving BS 902 transmits the candidate BS list to the MS 900.

Thereafter, the MS 900 having received the candidate BS list determines final candidate BSs satisfying the predetermined candidate BS determination condition among the candidate BSs included in the candidate BS list, configures a re-configured candidate BS list by the final candidate BSs, and transmits the re-configured candidate BS list to the serving BS 902 in step 935. For example, it is assumed that the candidate BS determination condition is set equally to this illustrative embodiment.

Then, in step 940, the serving BS 902 determines a number of member BSs configuring the cooperative communication-based cell of the MS 900 based on the re-configured candidate BSs. The number of member BSs is defined as a total number of cooperative BSs except for the serving BS 902. The number of member BSs corresponds to a number of BSs which does not increase complexity of the operation of the cooperative communication-based cell and maximizes capability of throughput of the cooperative communication-based cell and also corresponds to a number of BSs which can be supported by the MS 900.

In step 945, the serving BS 902 determines candidate BSs included in the re-configured BS list as targets to receive a member BS negotiation. In step 950, the serving BS 602 performs the member BS negotiation with the determined targets to receive the member BS negotiation in step 655. In the member BS negotiation, the serving BS 902 makes, to the target to receive the member BS negotiation, a request for a BS capability state required when the target operates as the member BS within the cooperative communication-based cell of the MS. For example, the BS capability state includes a channel state between the corresponding BS and the serving BS 602 (for example, RSSI, path loss and the like), a number of antennas of the corresponding BS, currently remaining power, available buffer capacity, cell load, and a number of available RF chains. Further, when the serving BS receives a response satisfying the required BS capability state from target to receive the member BS negotiation, the member BS negotiation is successfully performed.

Thereafter, in step 955, the serving BS identifies battery or cell loading state information of the candidate member BS acquired during the member BS negotiation process to identify whether the battery or load information of the candidate member BS satisfies a battery or cell load threshold. The serving BS identifies service quality of the candidate member BS having a battery or cell load value satisfying the battery or cell load threshold. When the service quality of the candidate member BS satisfies a preset service quality threshold, the candidate member BS is determined as a new member BS. Accordingly, it is assumed that the serving BS 902 determines a member BS update to add adjacent BS#2 906 as the new member BS. In step 960, the serving BS 902 transmits cooperative communication-based cell update information informing that adjacent BS#2 906 has been determined as the new member BS to the MS 900. The MS 900 having received the cooperative communication-based cell update information stores adjacent BS#2 904 in a cooperative communication-based cell member list managed by the MS 900 as a new cooperative BS. In step 965, the serving BS 902 transmits the cooperative communication-based cell update information to adjacent BS#1 904 corresponding to the existing member BS. In step 970, the serving BS 902 informs adjacent BS#2 906 that the member BS update process has been completed.

Meanwhile, although it has been described in FIG. 9 as an example that the member BS update process is performed by adding a new cooperative BS, the member BS update process according to an embodiment of the present disclosure may be expanded to a case where the existing member BS is removed or the serving BS is changed to the existing or new member BS.

In another illustrative embodiment of the present disclosure, the MS generates the candidate BS list including candidate BSs of member BSs configuring the cooperative communication-based cell of the MS based on strength of signals of received from adjacent BSs. Then, the serving BS finally determines member BSs based on the candidate BSs included in the candidate BS list. In this illustrative embodiment of the present disclosure, before filtering the candidate BSs included in the candidate BS list by using service quality, the serving BS further performs a filtering process using cell loading state information of the candidate BSs to finally determine member BSs of the candidate BSs having passed through a total of two filterings.

Figure 10:
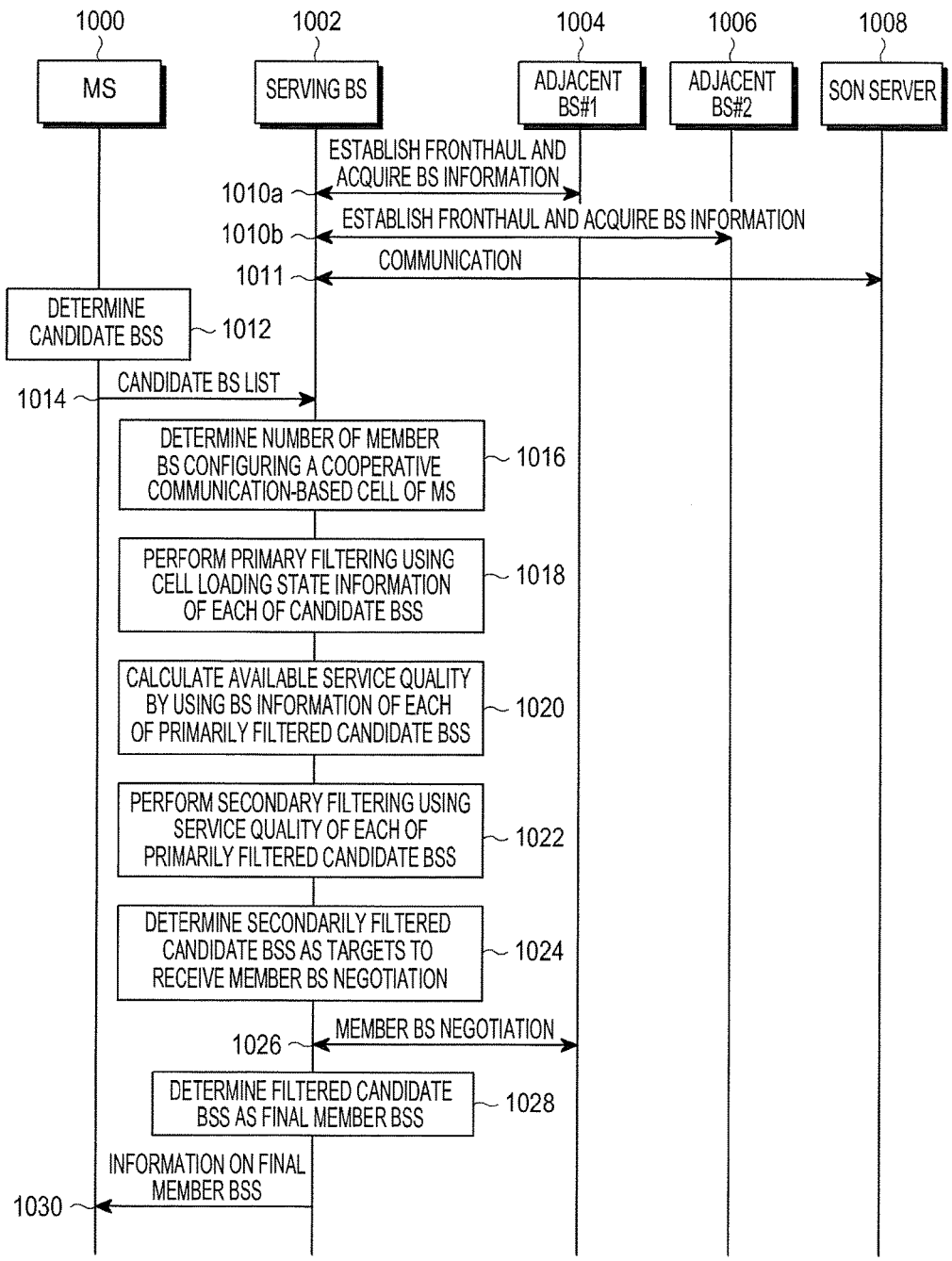
FIG. 10 illustrates an example of a flowchart of an overall operation in which a serving BS determines member BSs according to an illustrative embodiment of the present disclosure.

FIG. 10 illustrates an example of a flowchart of an overall operation in which the serving BS determines the member BSs according to an illustrative embodiment of the present disclosure. For the convenience of description, a serving BS 1002 configuring the cooperative communication-based cell of an MS 1000 has been already determined and adjacent BSs managed by the serving BS 1002 are, for example, adjacent BS#1 1004 and BS#2 1006. However, the number of adjacent BSs managed by the serving BS may be different from the example of FIG. 10 in practice.

Referring to FIG. 10, in steps 1010a to 1010b, the serving BS 1002 managing the cooperative communication-based cell of the MS 1000 has performed a fronthaul establishment process with adjacent BSs of the serving BS 1002, for example, adjacent BS#1 1004 and adjacent BS#2 1006 to acquire BS information of the corresponding adjacent BSs in advance from adjacent BS#1 1004 and adjacent BS#2 1006. Since the BS information of the adjacent BS indicates the corresponding BS position and basic capability and definitions thereof are identical to those in FIG. 2, a detailed description thereof will be omitted.

In step 1011, the serving BS 1002 communicates with a Self Optimized Network (SON) server 1008. When an amount of available resources of a corresponding adjacent BS among the adjacent BSs having established the fronthaul with the serving BS 1002 through the communication with the SON server 1008 is smaller than a minimum cell load value or an amount of used resources is larger than or equal to a maximum cell load value, the serving BS 1002 may receive information indicating the impossibility of servicing a new MS any more due to an excessive cell loading state (hereinafter referred to as "additional access impossibility indication").

In step 1012, the MS 1000 determines candidate BSs satisfying a predetermined candidate BS determination condition among adjacent BSs included in a scanning BS set and configures a candidate BS list by the candidate BSs. For example, the candidate BS determination condition may include a condition in which strength of a signal received from each of the adjacent BSs included in the scanning BS set is larger than or equal to a predetermined signal strength threshold or a condition in which the amount of the available resources indicated by the cell loading state information is larger than or equal to the minimum cell load value or the amount of the used resources is smaller than the maximum cell load value. In step 1014, the MS 1000 transmits the candidate BS list to the serving BS 1002. The candidate BS list may be inserted into an access request message and the access request message may be transmitted. Since the operation of the MS for generating the candidate BS list overlaps operations of FIGS. 3 and 11, a detailed description thereof will be omitted.

In step 1016, the serving BS 1002 determines a number of the member BSs configuring the cooperative communication-based cell of the MS 1000. The number of member BSs is defined as a total number of cooperative BSs except for the serving BS 1002. The number of member BSs corresponds to a number of BSs which does not increase complexity of the operation of the cooperative communication-based cell and maximizes capability of throughput of the cooperative communication-based cell and also corresponds to a number of BSs which can be supported by the MS 1000.

In step 1018, the serving BS 1002 performs a primary filtering by using the cell loading state information of the candidate BSs included in the candidate BS list. That is, when the serving BS 1002 receives the additional access impossibility indication of the corresponding candidate BS from the fronthaul established with each of the candidate BSs or the SON server 1008, the serving BS 1002 removes the corresponding candidate BS from the candidate BS list. In step 1020, the serving BS 1002 calculates service quality of each of the remaining candidate BSs (hereinafter referred to as "primarily filtered candidate BSs") except for the candidate BSs of which the additional access possibility indication is received. For the convenience of description, it is assumed that the primarily filtered candidate BSs are adjacent BS#1 1004 and adjacent BS#2 1006. Then, the serving BS 1002 calculates service quality of each of adjacent BS#1 1004 and adjacent BS#2 1006 by using BS information pre-acquired through the fronthaul establishment process with each of adjacent BS#1 1004 and adjacent BS#2 1006. In step 1022, the serving BS 1002 performs a secondary filtering for identifying whether the service quality calculated for each of the primarily filtered adjacent BSs, that is, adjacent BS#1 1004 and adjacent BS#2 1006 is larger than or equal to a predetermined service quality threshold. In step 1024, the serving BS 1002 determines the candidate BS having service quality larger than or equal to the service quality threshold (hereinafter referred to as "secondarily filtered candidate BS") as a target to receive a member BS negotiation among the primarily filtered candidate BSs. For the convenience of description, for example, it is assumed that adjacent BS#1 1004 is determined as the target to receive the member BS negotiation. Then, in step 1026, the serving BS 1002 performs the member BS negotiation with adjacent BS#1 1004. When the member BS negotiation is successfully performed, the serving BS 1002 determines adjacent BS#1 1004 as a final member BS in step 1028. In the member BS negotiation, the serving BS 1002 makes, to adjacent BS#1 1004, a request for a BS capability state required when adjacent BS#1 1004 operates as the member BS within the cooperative communication-based cell of the MS 1000. For example, the BS capability state includes a number of antennas of the corresponding BS, currently remaining power, available buffer capacity, cell load, and a number of available chains. Further, when the serving BS 1002 receives a response satisfying the required BS capability state from adjacent BS#1 1004, the member BS negotiation is successfully performed.

In step 1030, the serving BS 1002 transmits information related to the final member BS to the MS 1000. The information related to the final member BS includes information informing that adjacent BS#1 1004 has been determined as the final member BS and information on the final member BS, that is, indication information of adjacent BS#1 1004. The information may be transmitted through an access response to the access request. Although it has been described that the final member BS is only adjacent BS#1 1004, if a number of final member BSs is plural, the indication information can be configured in a form of a list of the plurality of final member BSs and then transmitted to the MS 1000.

Figure 11:
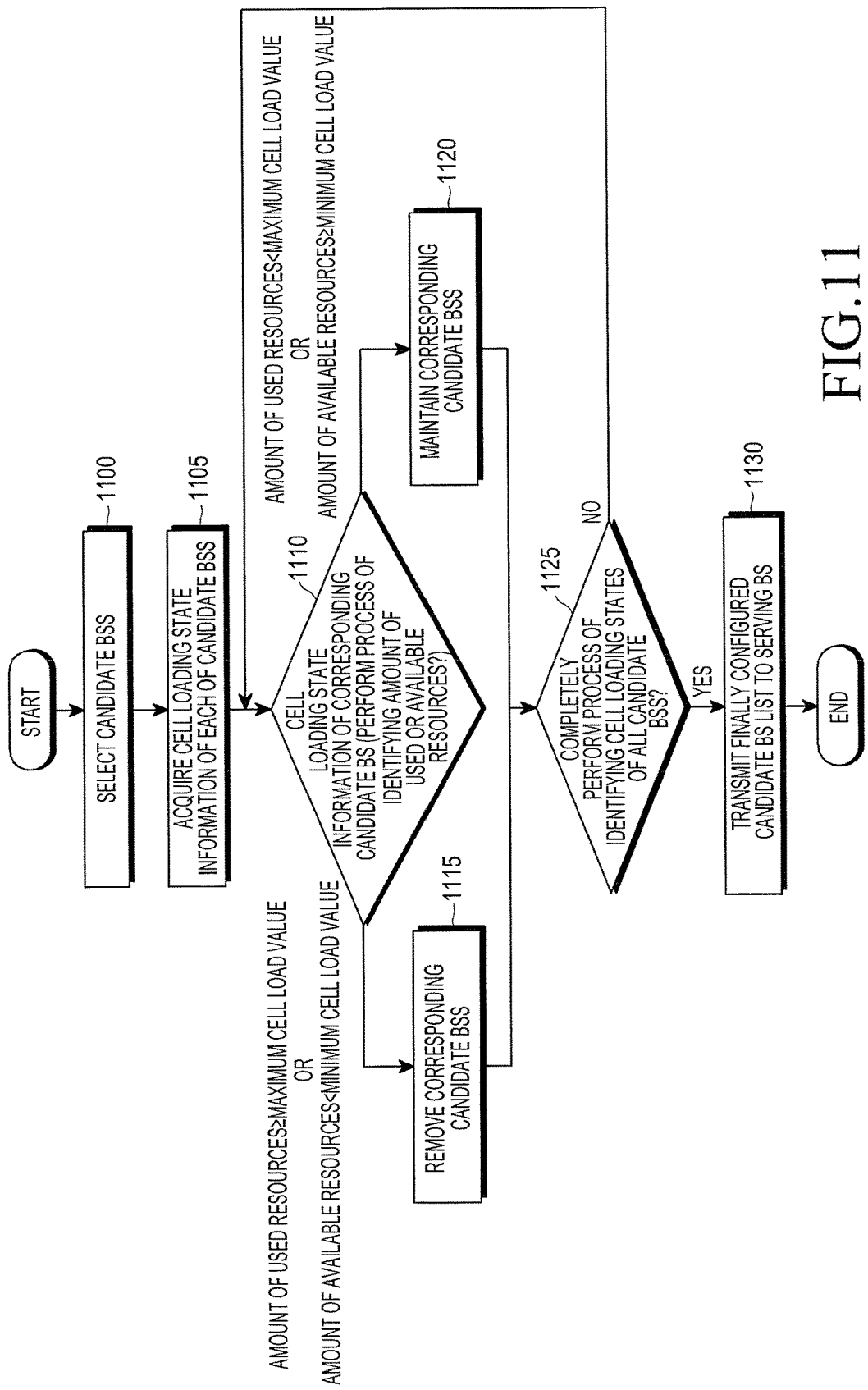
FIG. 11 illustrates an example of a flowchart of an operation in which an MS configures a candidate BS list according to an illustrative embodiment of the present disclosure.

FIG. 11 is a flowchart of an operation in which the MS configures the candidate BS list according to an illustrative embodiment of the present disclosure.

Referring to FIG. 11, since operations of the MS in steps 1100 to 1130 are the same as the operations of FIG. 3, a detailed description thereof will be omitted herein.

Figure 12A:
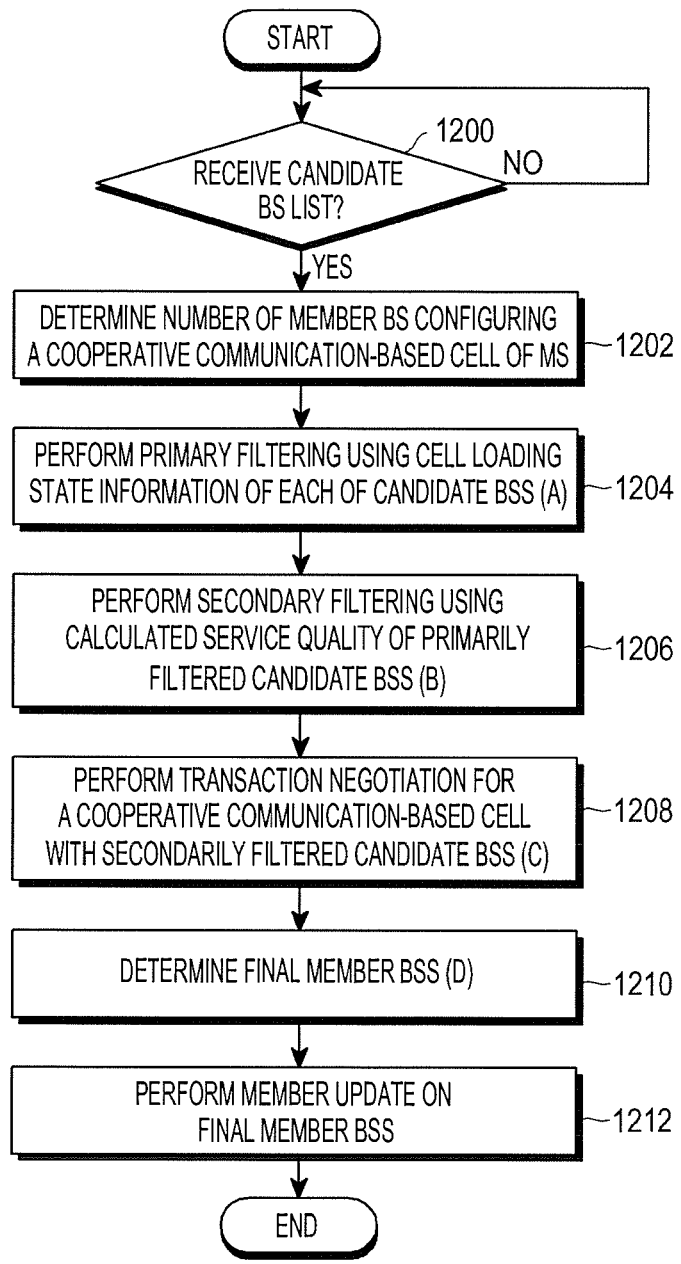
FIG. 12A illustrates an example of a flowchart of an overall operation in which a serving BS determines member BSs according to an illustrative embodiment of the present disclosure.

FIG. 12A is a flowchart of an overall operation in which the serving BS determines the member BSs according to an illustrative embodiment of the present disclosure.

Referring to FIG. 12A, the serving BS identifies whether the candidate BS list is received from the MS in step 1200. As described above, the candidate BS list includes adjacent BSs satisfying the candidate BS determination condition among the adjacent BSs included in the scanning BS set as the candidate BSs. For example, the candidate BS determination condition may include a condition in which strength of a signal received from each of the adjacent BSs included in the scanning BS set is larger than or equal to a predetermined signal strength threshold or a condition in which the amount of the available resources indicated by the cell loading state information is larger than or equal to the minimum cell load value or the amount of the used resources is smaller than the maximum cell load value. One or more parameters used for the candidate BS determination condition may be randomly selected by the MS or the parameter may be set to a default by a service provider. When two or more parameters are selected, a case where conditions according to the two or more parameters are all satisfied or a case where only at least one of conditions according to the two or more parameters is satisfied may be set as an option of the candidate BS determination condition. In another example, parameters may be used for the candidate BS determination condition when the MS acquires BS basic setting information, for example, information on a maximum buffer size, a maximum number of antennas, a maximum number of RF chains, and a maximum number of beams. Further, information required for expecting a degree of a service to be received by the MS through the corresponding BS may be also used for the candidate BS determination condition. As a result of the identification, when the candidate BS list is not received, the serving BS waits until the candidate BS list is received.

As a result of the identification, when the candidate BS list is received, the serving BS determines a number of member BSs configuring the cooperative communication-based cell of the MS in step 1202. The number of member BSs is defined as a total number of cooperative BSs except for the serving BS. The number of member BSs corresponds to a number of BSs which does not increase complexity of the operation of the cooperative communication-based cell and maximizes capability of throughput of the cooperative communication-based cell and also corresponds to a number of BSs which can be supported by the MS. In step 1204 (A), the serving BS performs a primary filtering by using cell loading state information of each of the candidate BSs. That is, the serving BS receives the cell loading state information of the corresponding candidate BS through communication with the fronthaul established with each of the corresponding candidate BSs or the SON server and identifies whether the cell loading state information includes the "additional access impossibility indication". As a result of the identification, the serving BS removes the candidate BSs having the cell loading state information including the additional access possibility indication from the candidate BS list to complete the primary filtering.

In step 1206(B), the serving BS calculates service quality of each of the primarily filtered candidate BSs by using BS information acquired during the fronthaul establishment process with the serving BS and then performs a secondary filtering for selecting candidate BSs having service quality larger than or equal to a predetermined service quality threshold. Further, the serving BS determines the secondarily filtered candidate BSs as targets to receive the member BS negotiation. The service quality threshold may be described below in detail with reference to FIG. 12C. As described above, the BS information includes the BS position and basic capability which the serving BS acquires during the fronthaul establishment process with the corresponding BS. Specifically, the serving BS calculates service quality of each of the candidate BSs included in the candidate BS list, for example, Equation (1) above by using the BS information acquired through the fronthaul establishment process with each of the candidate BSs.

Meanwhile, when the cooperative communication-based cell is re-configured, MS mobility may be also used as a member BS negotiation condition. The MS mobility corresponds to information on a movement speed or a movement direction of the MS.

In step 1208(C), the serving BS performs the transaction negotiation with each of the targets to receive the member BS negotiation. The transaction negotiation refers to communication for identifying a BS capability state of each of the targets to receive the member BS negotiation. When the BS operates as the member BS configuring the cooperative communication-based cell of the MS, the transaction negotiation refers to identification of a required BS capability state, identification of BS cell load information, and identification of throughput required for servicing the MS.

In step 1210 (D), the serving BS determines candidate BSs having successfully passed through the transaction negotiation as the final member BSs among the targets to receive the member BS negotiation. When the number of final member BSs is smaller than a predetermined number of member BSs, the serving BS may further select candidate BSs which do not satisfy the service quality threshold from the candidate BSs included in the candidate BS list in order starting from highest service quality until the number of final member BSs reaches the predetermined number of member BSs. Meanwhile, when there is no final member BS determined in step 1210, the serving BS selects candidate BSs, which do not satisfy the threshold of quality of service, corresponding to the predetermined number of member BSs from the candidate BSs in order starting from highest service quality. In another embodiment, when the number of final member BSs exceeds the number of member BSs, the serving BS may select again final member BSs corresponding to the number of member BSs from the final member BSs in order starting from highest service quality.

In step 1212, the serving BS performs a member BS update for transmitting information on the determined final member BSs to the MS and the final member BSs.

Hereinafter each of the operations in which the serving BS determines the member BSs according to this illustrative embodiment of the present disclosure will be described in more detail with reference to FIGS. 12B to 12F.

Figure 12B:
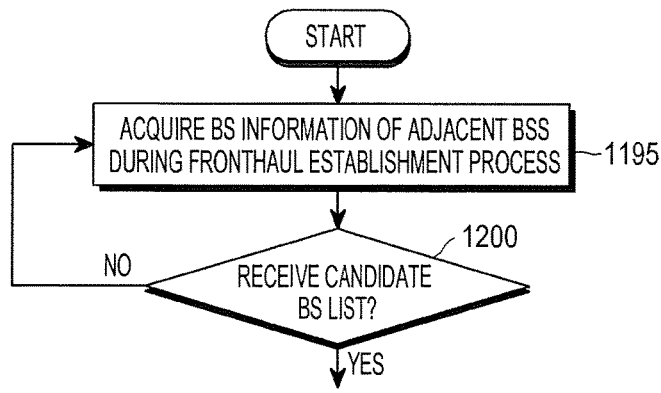
FIG. 12B illustrates an example of a flowchart of an operation before a serving BS receives a candidate BS list from an MS among the operation in which the serving BS determines the member BSs according to an illustrative embodiment of the present disclosure.

FIG. 12B illustrates an example of a flowchart of an operation before the serving BS receives the candidate BS list from the MS among the operation in which the serving BS determines the member BSs according to an illustrative embodiment of the present disclosure.

Referring to FIG. 12B, in step 1195, the serving BS performs a process of acquiring BS information on adjacent BSs through the fronthaul establishment process with each of the corresponding adjacent BSs. The BS information is used for the primary filtering for selecting members of the candidate BS list. In step 1200, the serving BS waits to receive the candidate BS list from the MS. According to whether the serving BS receives the candidate BS list in step 1200, the serving BS operates equally to steps 1202 to 1212 of FIG. 12A, so that a detailed description thereof will be omitted.

Figure 12C:
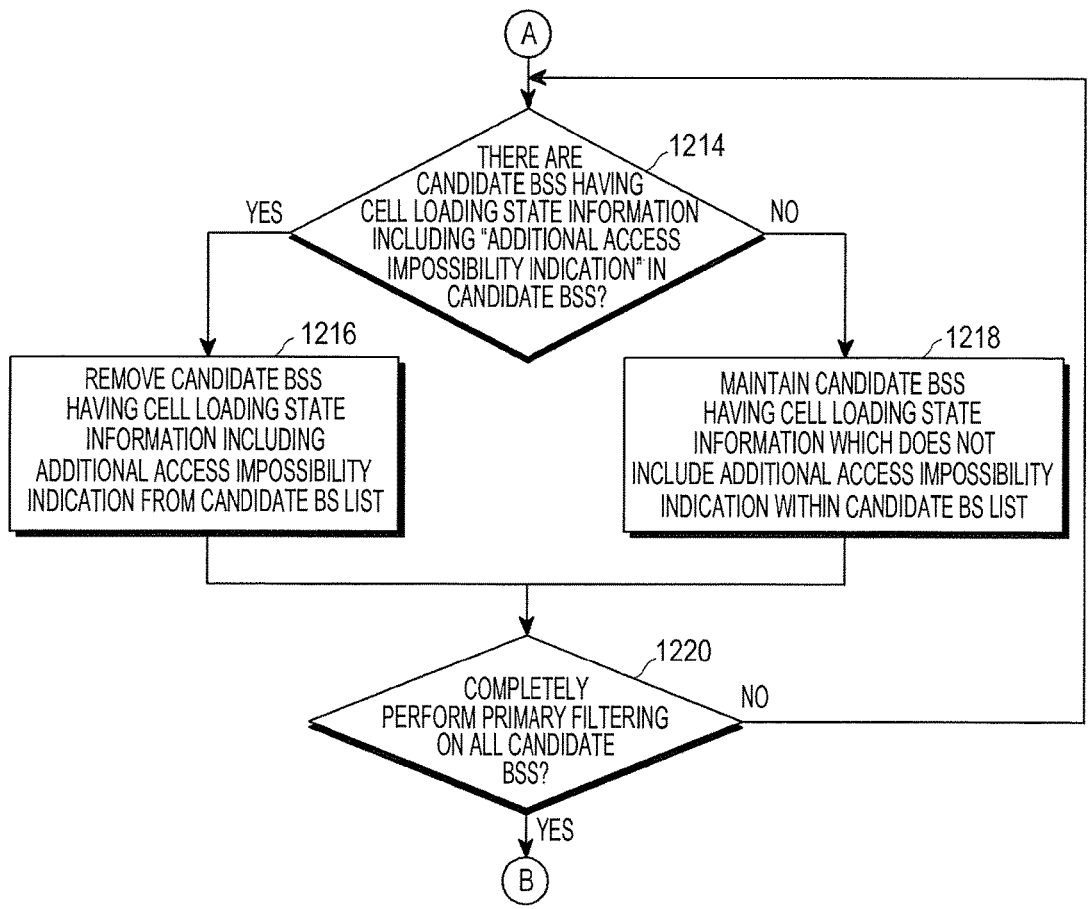
FIG. 12C illustrates an example of a flowchart of a detailed operation of a primary filtering operation using cell loading state information among the operation of the serving BS according to an illustrative embodiment of the present disclosure.

FIG. 12C illustrates an example of a flowchart of a detailed operation of a primary filtering operation using cell loading state information among the operation of the serving BS according to an illustrative embodiment of the present disclosure. That is, FIG. 12C is a detailed operation flowchart of step 1204 (A) of FIG. 12A.

Referring to FIG. 12C, in step 1214, the serving BS identifies BS information acquired in advance during the fronthaul establishment process with adjacent BSs or BS information acquired from the SON server to identify whether there are candidate BSs having cell loading state information including the "additional access impossibility indication" among the candidate BSs included in the candidate BS list.

Through a result of the identification, the serving BS removes the candidate BSs having the cell loading state information including the additional access impossibility indication from the candidate BS list in step 1216 and proceeds to step 1220. Through a result of the identification, the serving BS maintains the candidate BSs having the cell loading state information which does not include the additional access impossibility indication as the members of the candidate BS list in step 1218 and proceeds to step 1220. In step 1220, the serving BS identifies whether all the candidate BSs included in the candidate BS list have passed through the primary filtering as described in steps 1214 to 1218. As a result of the identification, when there is a candidate BS which has not passed through the primary filtering, the serving BS proceeds to step 1214 to perform the primary filtering on a next candidate BS. As a result of the identification, when all the candidate BSs have passed through the primary filtering, the serving BS performs a secondary filtering on the primarily filtered candidate BSs.

As described above, in FIGS. 12A to 12C, an example in which the serving BS performs the primary filtering on the candidate BSs by using the fronthaul establishment process with the adjacent BSs or the "additional access impossibility indication" included in the cell loading state information of the adjacent BSs acquired from the SON server has been described.

Alternatively, the serving BS does not separately perform the primary filtering after receiving the candidate BS list but performs the primary filtering during the process of generating the candidate BS list. Specifically, the MS receives the cell loading state information of the adjacent BSs included in the scanning BS set through a broadcasting channel. Then, when there are adjacent BSs having the cell loading state information including the "additional access impossibility indication", the MS may exclude the adjacent BSs from the candidate BS list even though the adjacent BSs correspond to the candidate BSs satisfying the candidate BS determination condition and then transmit the candidate BS list to the serving BS.

Figure 12D:
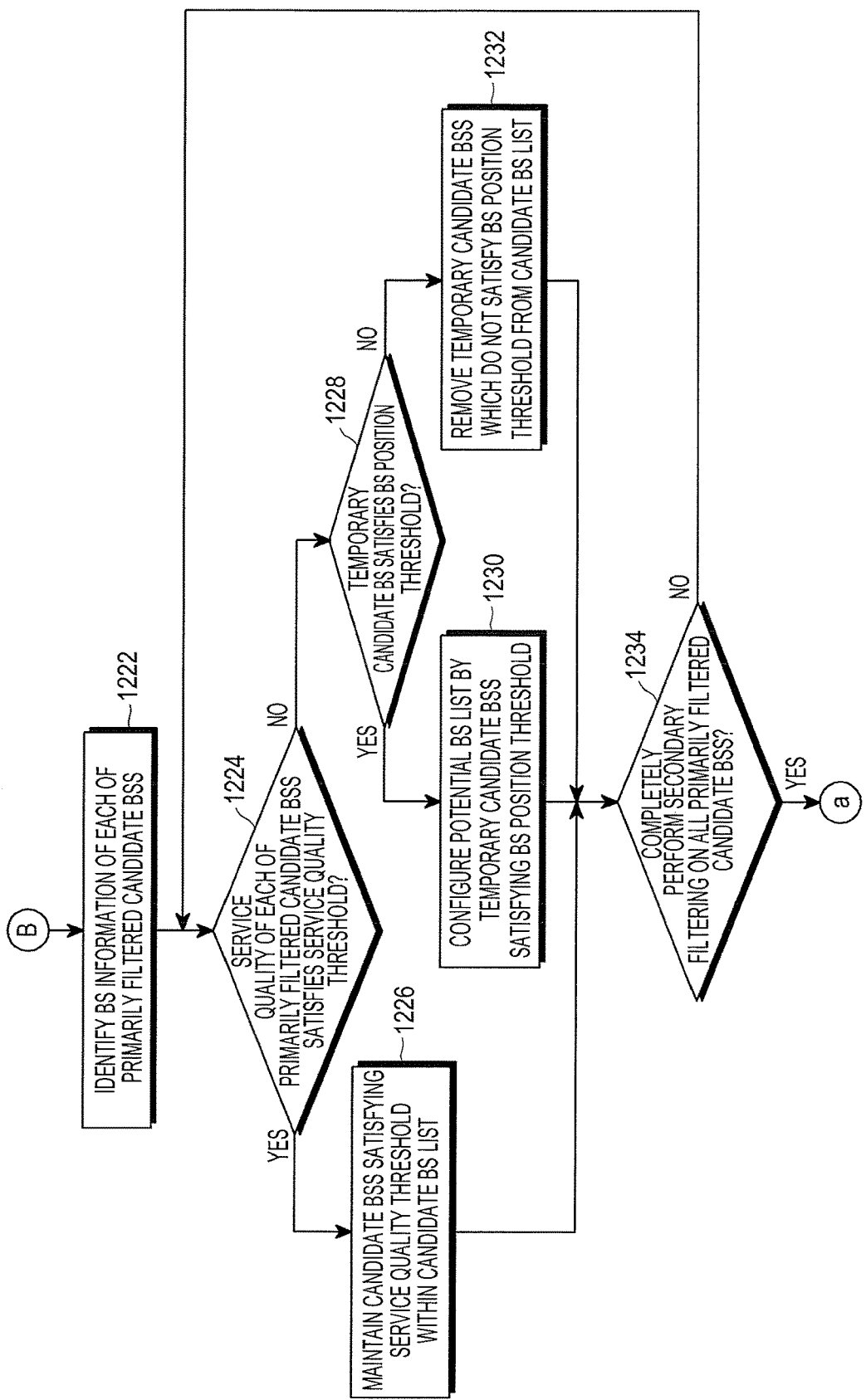
FIGS. 12D and 12E illustrate an example of a flowchart of a detailed operation for performing a secondary filtering on primarily filtered candidate BSs and determining targets to receive a member BS negotiation among the operation of the serving BS according to an illustrative embodiment of the present disclosure.
Figure 12E:
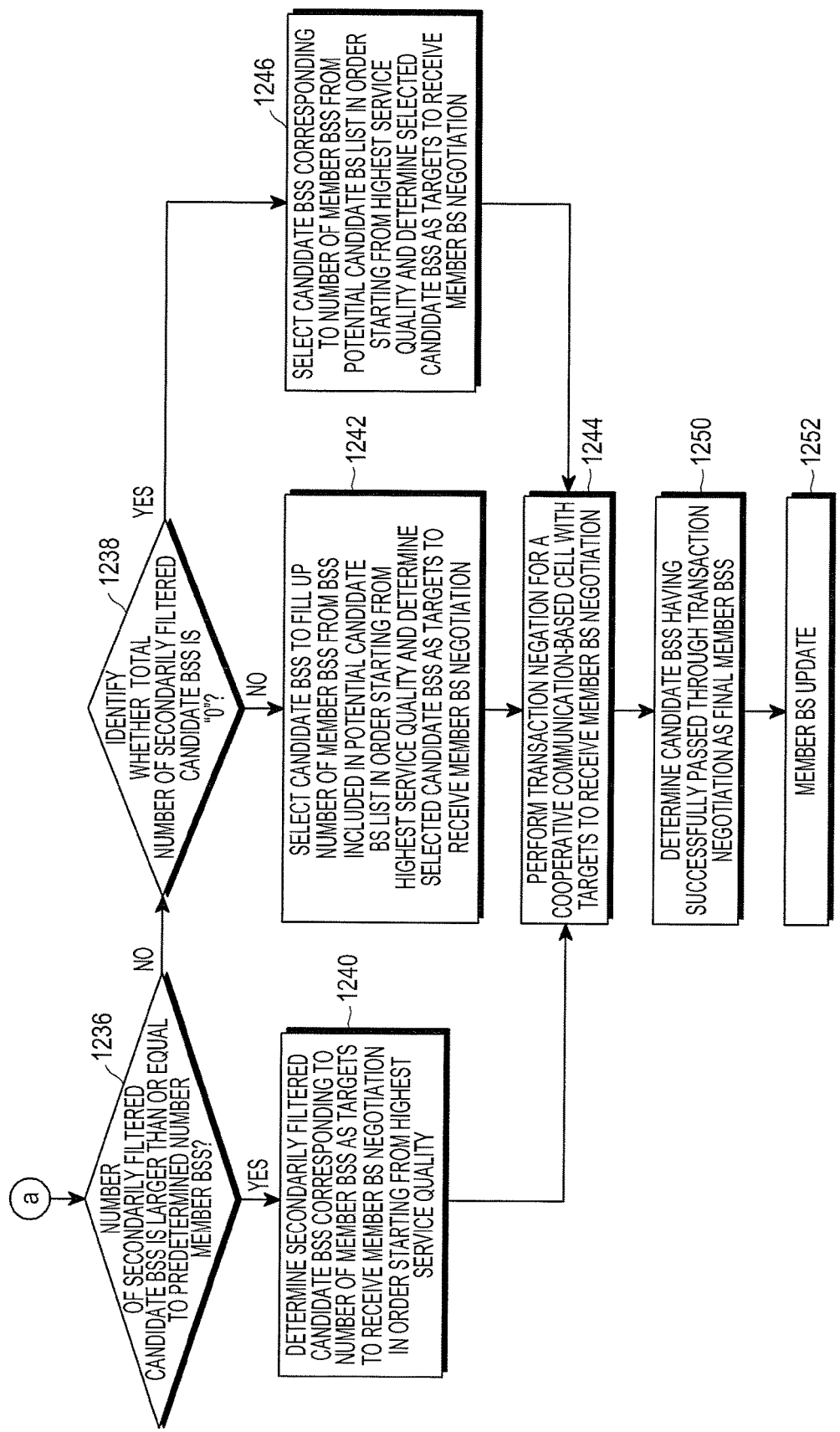

FIGS. 12D and 12E illustrate an example of a flowchart of a detailed operation for performing the secondary filtering on the primarily filtered candidate BSs and determining targets to receive a member BS negotiation among the operation of the serving BS according to an illustrative embodiment of the present disclosure. That is, FIGS. 12D and 12E are a flowchart of detailed operation of step 1206 (B) of FIG. 12A.

Referring to FIG. 12D, in step 1222, the serving BS identifies BS information on each of the primarily filtered candidate BSs among the BS information pre-acquired during the fronthaul establishment process with the adjacent BSs. It is assumed that the BS information corresponds to the above mentioned BS basic capability and position information and the candidate BSs correspond to some of the adjacent BSs having established the fronthaul with the serving BS. In step 1224, the serving BS calculates service quality for each of the candidate BSs by using the acquired BS information and Equation (1) above.

Hereinafter through steps 1224 to 1232, the serving BS calculates service quality of each of the primarily filtered candidate BSs to perform the secondary filtering and determines whether to maintain the candidate BSs as members of the candidate BS list, so as to re-configure the candidate BS list. Specifically, in step 1224, the serving BS compares service quality of one of the primarily filtered candidate BSs with a preset service quality threshold. The service quality corresponds to, for example, throughput, QoE, QoS and the like required for communication with the cooperative communication-based cell. The service quality is reflected through a parameter indicating the BS capability and a parameter indicating the BS position. When the corresponding candidate BS operates as the member BS within the cooperative communication-based cell of the MS, the BS capability corresponds to a number of required antennas, required transmission power, required buffer capacity, and required RF chains. The BS position corresponds to a hop count between BSs satisfying latency required within the cooperative-communication-based cell, a corresponding BS position from each of the MS and the serving BS, a path loss between BSs, and strength of a signal received by the serving BS. The MS mobility may be also considered as the parameter indicating the service quality of the candidate BS. Through a result of the comparison, the serving BS maintains the candidate BS satisfying the service quality threshold, that is, the candidate BS having the service quality larger than or equal to the service quality threshold among the primarily filtered candidate BSs as the member BS of the candidate BS list in step 1226 and proceeds to step 1234.

After the comparison, the serving BS identifies whether position information of the candidate BSs which do not satisfy the service quality threshold, that is, the candidate BSs having the service quality smaller than the service quality threshold (hereinafter referred to as "temporary candidate BSs") among the primarily filtered candidate BSs satisfies a BS position threshold in step 1228. As a result of the identification, when the position information of each of the temporary candidate BSs is within the BS position threshold, the serving BS proceeds to step 1230. More specifically, the position information of each of the temporary candidate BSs may be calculated by a distance from the MS. In this event, the BS position threshold may be indicated by a threshold of the distance from the MS. The serving BS configures a potential candidate BS list by the temporary candidate BSs in step 1230 and proceeds to step 1234. As a result of the identification, when there are the temporary candidate BSs having the position information which is not within the BS position threshold, the serving BS removes the temporary candidate BSs having the position information which is not within the BS position threshold from the candidate BS list in step 1232 and proceeds to step 1234.

In step 1234, the serving BS identifies whether all the candidate BSs primarily filtered through steps 1224 to 1232 have been determined as to whether to be maintained as the members of the candidate BS list, that is, whether the secondary filtering has been performed on all the primarily filtered candidate BSs. As a result of the identification, when the secondary filtering has not been completely performed on the primarily filtered candidate BSs, the serving BS proceeds to step 1224. Then, the serving BS determines whether to maintain a next candidate BS as the member of the candidate BS list and repeats steps 1224 to 1232 until the secondary filtering is completely performed on all the primarily filtered candidate BSs.

Referring to FIG. 12E, as a result of the identification, when the secondary filtering has been completely performed on all the primarily filtered candidate BSs, the serving BS performs a comparison of whether a total number of secondarily filtered candidate BSs is larger than or equal to a preset number of member BSs ins step 1236(*a*). As a result of the comparison, when the total number of secondarily filtered candidate BSs is larger than or equal to the number of member BSs, the serving BS determines the secondarily filtered candidate BSs corresponding to the number of member BSs as targets to receive the member BS negotiation in order starting from highest service quality in step 1240. The serving BS performs the transaction negotiation for the cooperative communication-based cell with the selected targets to receive the member BS negotiation in step 1244 and proceeds to step 1250.

As a result of the comparison, when the total number of secondarily filtered candidate BSs is smaller than the number of member BSs, the serving BS identifies whether the total number of secondarily filtered candidate BSs is "0" in step 1238. As a result of the identification, when the total number of secondarily filtered BSs is not "0", the serving BS selects a number of candidate BSs so as to fulfill the number of member BSs from the BSs included in the potential candidate BS list in order starting from highest service quality and determines the selected candidate BSs as the targets to receive the member BS negotiation in step 1242. The serving BS performs the transaction negotiation for the cooperative communication-based cell with the selected targets to receive the member BS negotiation in step 1244 and proceeds to step 1250.

As a result of the identification, when the total number of secondarily filtered candidate BSs is "0", the serving BS selects candidate BSs corresponding to the number of member BSs from the potential candidate BS list in order starting from highest service quality and determines the selected candidate BSs as the targets to receive the member BS negotiation in step 1246 and proceeds to step 1244. The serving BS performs the transaction negotiation for the cooperative communication-based cell with the selected targets to receive the member BS negotiation in step 1244 and proceeds to step 1250.

In step 1250, the serving BS determines candidate BSs having successfully passed through the transaction negotiation as the final member BSs. Further, in step 1250, the serving BS performs a member BS update operation of transmitting information on the final member BSs to the MS and the final member BSs.

Figure 12F:
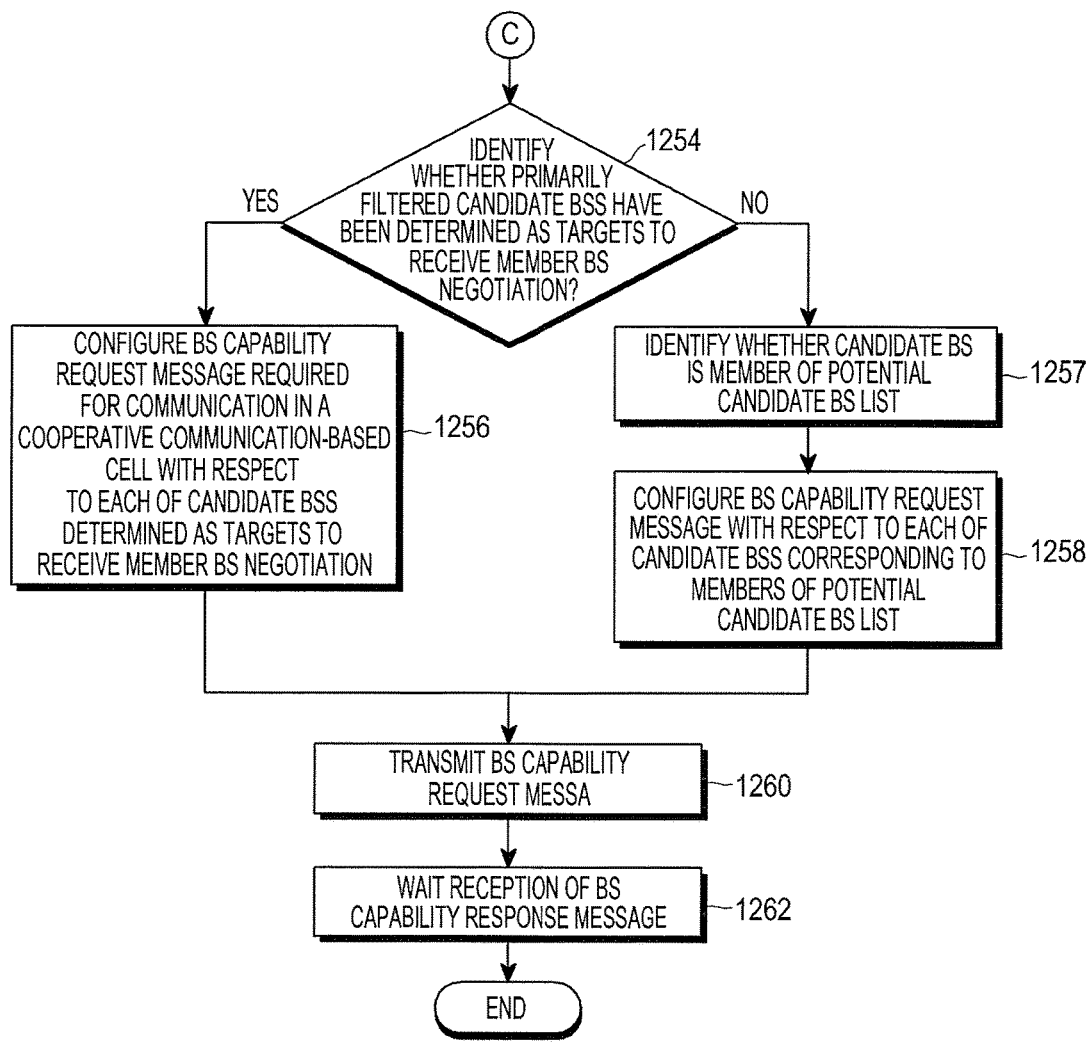
FIG. 12F illustrates an example of a flowchart of a detailed operation for performing a transaction negotiation with a target to receive a member BS negotiation for a cooperative communication-based cell among the operation in which the serving BS determines the member BSs according to an illustrative embodiment of the present disclosure.

FIG. 12F illustrates an example a flowchart of a detailed operation for performing the transaction negotiation for the cooperative communication-based cell with the targets to receive the member BS negotiation among the operation in which the serving BS determines the member BSs according to an illustrative embodiment of the present disclosure. That is, FIG. 12E is a flowchart of detailed operation of step 1208 (C) of FIG. 12A.

Referring to FIG. 12F, in step 1254 (C), the serving BS identifies whether the secondary filtering has been completely performed on the primarily filtered candidate BSs and the secondarily filtered candidate BSs have been determined as the targets to receive the member BS negotiation. Since the operation for identifying whether the primarily filtered candidate BSs have been determined as the targets to receive the member BS negotiation through the secondary filtering overlaps the description in FIG. 12E, a detailed description thereof will be omitted herein.

As a result of the identification, for the candidate BSs determined as the targets to receive the member BS negotiation, the serving BS configures a BS capability request message of making a request for BS capability required for communication in the cooperative communication-based cell in step 1256 and proceeds to step 1260. When the corresponding candidate BS operates as the member BS within the cooperative communication-based cell of the MS, the BS capability request message includes a number of required antennas, required transmission power, required buffer capacity, and required RF chains as the BS capability.

In step 1260, the serving BS transmits the BS capability request message of the corresponding BS to each of the candidate BSs determined as the targets to receive the member BS negotiation. In step 1262, the serving BS waits to receive a BS capability response message corresponding to the BS capability request message from the corresponding candidate BSs. The BS capability response message includes parameters indicating the capability of the corresponding candidate BS, that is, a number of antennas of the corresponding BS, currently remaining power, available buffer capacity, cell load, and a number of available RF chains.

Meanwhile, through a result of the identification in step 1254, among the candidate BSs which have not been determined as the targets to receive the member BS negotiation, candidate BSs satisfying the BS position threshold may be selected as the members of the potential candidate BS list. The potential candidate BS list includes candidate BSs which do not satisfy the service quality threshold but satisfy the BS position threshold among the primarily filtered candidate BSs. Further, when the total number of secondarily filtered candidate BSs is "0" or when the total number of secondarily filtered candidate BSs is smaller than the number of member BSs, the potential candidate BS list stores candidate BSs which can be additionally selected as the targets to receive the member BS negotiation to fill up the number of member BSs. Accordingly, the serving BS identifies whether the candidate BSs which have not been determined as the targets to receive the member BS negotiation among the candidate BSs identified in step 1254 correspond to the members of the potential candidate BS list in step 1257. Further, for the identified members of the potential candidate BS list, the serving BS configures a BS capability request message of making a request for BS capability required for communication in the cooperative communication-based cell of the corresponding candidate BS in step 1258 and proceeds to step 1260.

Figure 12G:
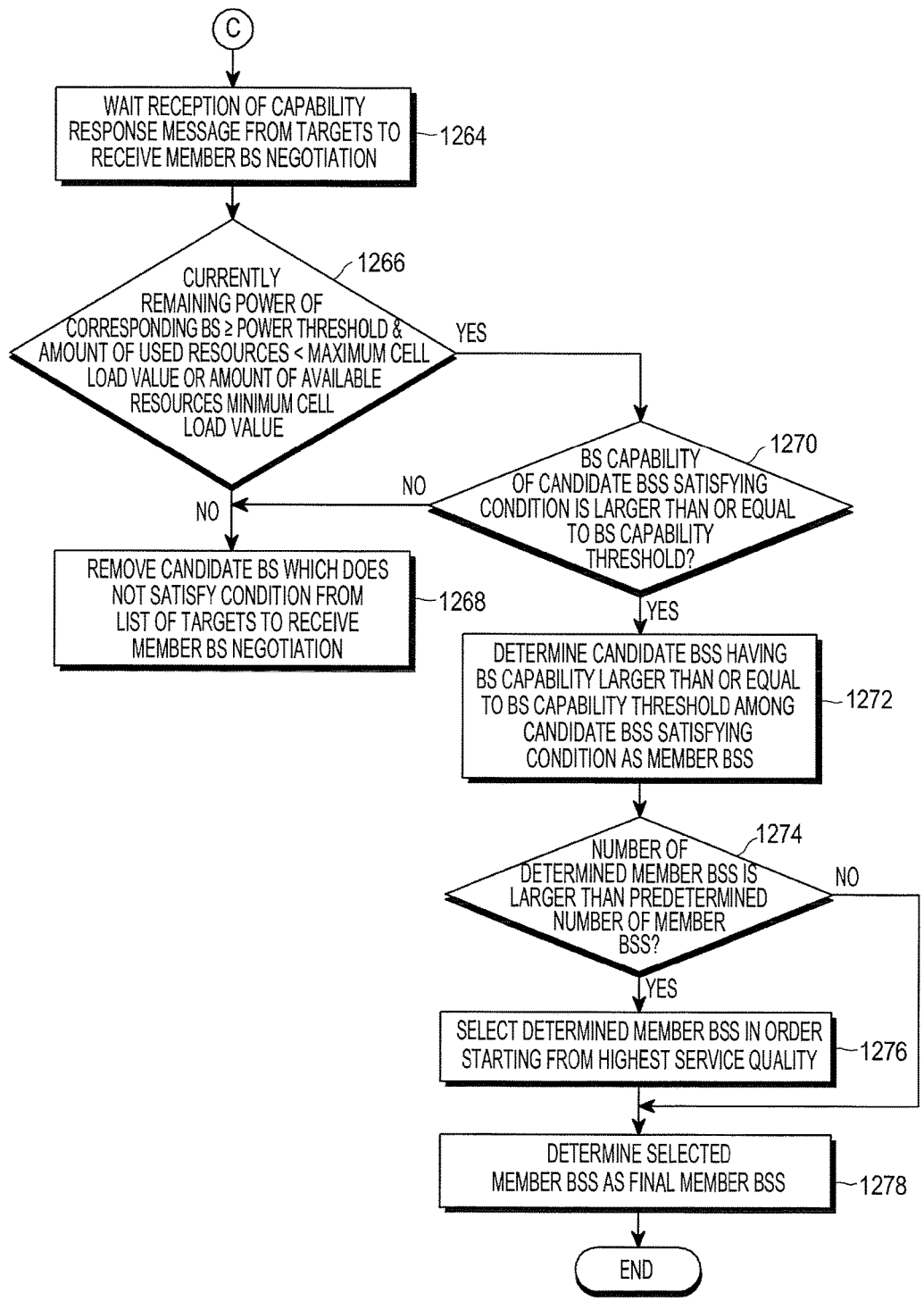
FIG. 12G illustrates an example of a flowchart of a detailed operation for determining a final member BS among the operation in which the serving BS determines the member BSs according to an illustrative embodiment of the present disclosure.

FIG. 12G illustrates an example of a flowchart of a detailed operation for determining the final member BS among the operation in which the serving BS determines the member BSs according to an illustrative embodiment of the present disclosure. That is, 12G illustrates an example of a flowchart of a detailed operation of step 1210(D) of FIG. 12A.

Referring to FIG. 12G, in step 1264, the serving BS receives a BS capability response message from the targets to receive the member BS negotiation having received the capability request message. The targets to receive the member BS negotiation refers to candidate BSs having completely passed through the primary filtering and the secondary filtering among the candidate BSs included in the candidate BS list transmitted by the MS according to this illustrative embodiment of the present disclosure. The BS capability response message includes parameters indicating the capability of the corresponding candidate BS, that is, a number of antennas of the corresponding BS, currently remaining power, available buffer capacity, cell load, and a number of available RF chains.

In step 1266, the serving BS analyzes parameters included in the BS capability response message received from each of the targets to receive the member BS negotiation. For example, the serving BS identifies whether a condition in which the currently remaining power of the corresponding BS is larger than or equal to a predetermined power threshold is satisfied or a condition in which current cell load, that is, an amount of available resources is larger than or equal to a minimum cell load value or an amount of used resource is smaller than a maximum cell load value is satisfied. The conditions may be set according to a comparison between at least one of the parameters and a threshold corresponding to the parameter as well as the currently remaining power and the cell load.

As a result of the identification, when there is at least one candidate BS which is not included in the conditions, the serving BS removes the candidate BS which is not included in the conditions from a list of the targets to receive the member BS negotiation in step 1268.

As a result of the identification, when there is the candidate BS satisfying the conditions, the serving BS identifies whether service quality of the corresponding BS is larger than or equal to a predetermined BS service quality threshold in step 1270. Through a result of the identification, the serving BS also removes the candidate BSs having the BS service quality which does not satisfy the BS service quality threshold among the candidate BSs satisfying the conditions from the list of the targets to receive the member BS negotiation in step 1268.

Through a result of the identification, the serving BS determines the candidate BSs having the BS service quality satisfying the service quality threshold among the candidate BSs satisfying the conditions as the member BSs in step 1272. In step 1274, the serving BS identifies whether a total number of determined member BSs is larger than a predetermined number of member BSs. As a result of the identification, when the total number of determined member BSs is smaller than or equal to the number of member BSs, the serving BS proceeds to step 1278. As a result of the identification, when the total number of determined member BSs is larger than the predetermined number of member BSs, the serving BS selects only as many member BSs as the predetermined number of member BSs from the determined member BSs in order starting from highest service quality in step 1276. In step 1278, the serving BS determines the selected member BSs as the final member BSs.

Figure 13:
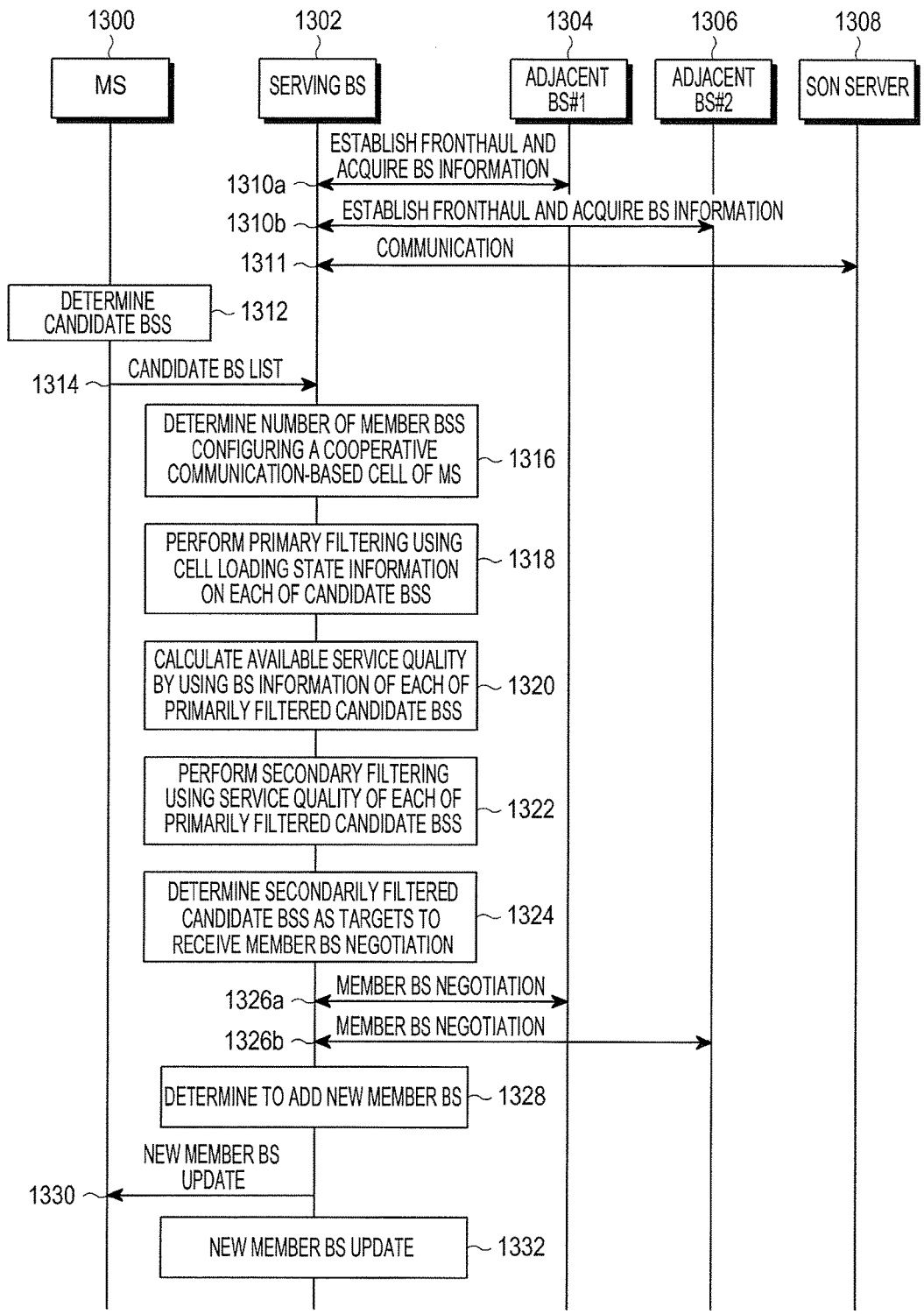
FIG. 13 illustrates an example of a flow diagram of an overall operation for updating member BSs configuring a cooperative communication-based cell of an MS according to an illustrative embodiment of the present disclosure.

FIG. 13 illustrates an example of a flow diagram of an overall operation for updating the member BSs configuring the cooperative communication-based cell of the MS according to an illustrative embodiment of the present disclosure. For the convenience of description, it is assumed that a serving BS 1302 configuring the cooperative communication-based cell of an MS 1300 updates adjacent BS#2 1306 as a new member BS in a state where the serving BS 1302 finally determines adjacent BS#1 1304 as a member BS, that is, a cooperative BS.

Referring to FIG. 13, in steps 1310*a* to 1310*c*, the serving BS 1302 managing the cooperative communication-based cell of the MS 1300 has performed a fronthaul establishment process with adjacent BSs of the serving BS 1302, for example, adjacent BS#1 1304 and adjacent BS#2 1306 to acquire BS information of the corresponding adjacent BSs in advance from adjacent BS#1 1304 and adjacent BS#2 1306. Since the BS information of the adjacent BS indicates the corresponding BS position and basic capability and definitions thereof are identical to those in FIG. 2, a detailed description thereof will be omitted.

In step 1311, the serving BS 1302 communicates with a Self Optimized Network (SON) server 1308. The serving BS 1302 may receive an additional access impossibility indication of a corresponding adjacent BS of the adjacent BSs having established the fronthaul with the serving BS 1302 through the communication with the SON server 1308.

In step 1312, the MS 1300 determines candidate BSs satisfying a predetermined candidate BS determination condition among adjacent BSs included in a scanning BS set and configures a candidate BS list by the candidate BSs. For example, the candidate BS determination condition may include a condition in which strength of a signal received from each of the adjacent BSs included in the scanning BS set is larger than or equal to a predetermined signal strength threshold or a condition in which an amount of available resources indicated by cell loading state information is larger than or equal to a minimum cell load value or an amount of used resources is smaller than a maximum cell load value. In step 1314, the MS 1300 transmits the candidate BS list to the serving BS 1302. The candidate BS list may be inserted into an access request message and the access request message may be transmitted. Since the operation of the MS for generating the candidate BS list overlaps operations of FIGS. 3 and 11, a detailed description thereof will be omitted.

In step 1316, the serving BS 1302 determines a number of the member BSs configuring the cooperative communication-based cell of the MS 1300. The number of member BSs is defined as a total number of cooperative BSs except for the serving BS 1302. The number of member BSs corresponds to a number of BSs which does not increase complexity of the operation of the cooperative communication-based cell and maximizes capability of throughput of the cooperative communication-based cell and also corresponds to a number of BSs which can be supported by the MS 1300.

In step 1318, the serving BS 1302 performs a primary filtering by using the cell loading state information of the candidate BSs included in the candidate BS list. That is, when the serving BS 1302 receives the additional access impossibility indication of the corresponding candidate BS from the fronthaul established with each of the candidate BSs or the SON server 1308, the serving BS 1002 removes the corresponding candidate BS from the candidate BS list. In step 1320, the serving BS 1302 calculates service quality of each of the remaining candidate BSs, that is, primarily filtered candidate BSs except for the candidate BSs of which the additional access possibility indication is received. For the convenience of description, it is assumed that the primarily filtered candidate BSs are adjacent BS#1 1304 and adjacent BS#2 1306. Then, the serving BS 1302 calculates service quality of each of adjacent BS#1 1304 and adjacent BS#2 1306 by using BS information pre-acquired through the fronthaul establishment process with each of adjacent BS#1 1304 and adjacent BS#2 1306. In step 1322, the serving BS 1302 performs a secondary filtering for identifying whether the service quality calculated for each of the primarily filtered adjacent BSs, that is, adjacent BS#1 1304 and adjacent BS#2 1306 is larger than or equal to a predetermined service quality threshold. In step 1324, the serving BS 1002 determines the candidate BS having service quality larger than or equal to the service quality threshold, that is, secondarily filtered candidate BSs as a target to receive a member BS negotiation among the primarily filtered candidate BSs. For the convenience of description, for example, it is assumed that adjacent BS#2 1306 is determined as the target to receive the member BS negotiation. Then, in steps 1326*a* and 1326*b*, the serving BS 1302 performs the member BS negotiation with adjacent BS#1 1304 and adjacent BS#2 1306. For example, when the member BS negotiation with adjacent BS#2 1306 is successfully performed, the serving BS 1302 determines to add adjacent BS#2 1306 as a new member BS in step 1328. In the member BS negotiation, the serving BS 1302 makes, to adjacent BS#2 1306, a request for a BS capability state required when adjacent BS#2 1306 operates as the member BS within the cooperative communication-based cell of the MS 1300. For example, the BS capability state includes a number of antennas of the corresponding BS, currently remaining power, available buffer capacity, cell load, and a number of available chains. Further, when the serving BS 1302 receives a response satisfying the required BS capability state, the member BS negotiation is successfully performed.

In step 1330, the serving BS 1302 transmits update information informing that adjacent BS#2 1302 has been added as the new member BS and indication information of adjacent BS#2 1306 to the MS 1300. The information may be transmitted through an access response to the access request. In step 1332, the serving BS 1302 updates the new member BS. Meanwhile, although it has been described as an example that the member BS update process corresponds to adding the new cooperative BS in FIG. 13, the member BS update process may be expanded to a case where the existing member BS is removed or a case where the serving BS 1302 is determined as the existing or new member BS.

Figure 14:
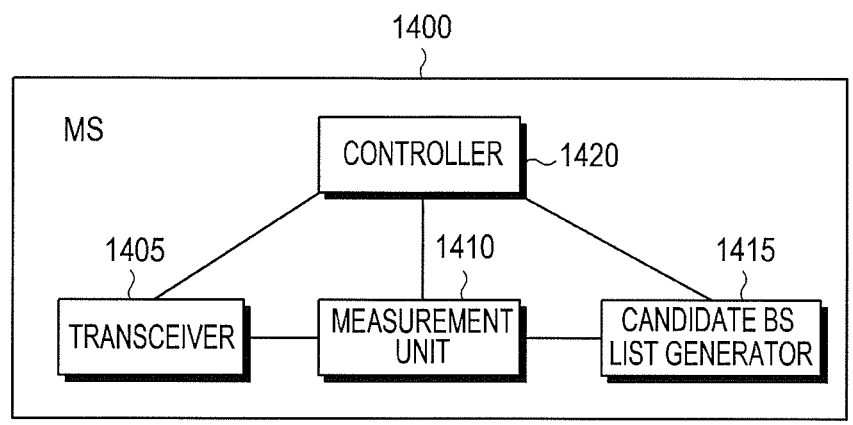
FIG. 14 illustrates an example of a schematic configuration of an MS according to an embodiment of the present disclosure.

FIG. 14 illustrates an example of a schematic configuration of the MS according to an embodiment of the present disclosure.

Referring to FIG. 14, an MS 1400 includes, for example, a transceiver 1405, a measurement unit 1410, a candidate BS list generator 1415, and a controller 1420. For the convenience of description, the configuration of the MS 1400 in FIG. 14 is divided into a plurality of units separated by operations according to an embodiment of the present disclosure. However, the configuration of the MS may be configured by one unit or divided into other types of sub units according to real implementations.

An operation of the MS 1400 according to the present disclosure is largely divided into the operation according to the embodiments discussed above with regard to FIGS. 2-5 and FIGS. 10-13 and the operation according to the embodiments discussed above with regard to FIGS. 10-13.

First, in the operation of the MS 1400 according to the embodiments discussed above with regard to FIGS. 2-5 and FIGS. 10-13 of the present disclosure, the measurement unit 1410 measures strength of signals received from adjacent BSs included in a scanning set or performs blind scanning on BSs recognized without the aid of the serving BS.

The transceiver 1405 receives cell loading state information of the adjacent BSs through a broadcasting channel.

Then, the controller 1420 sets a candidate BS determination condition by using at least one of a predetermined signal strength threshold and a cell load threshold and transmits the set candidate BS determination condition to the BS list generator 1415. The candidate BS list generator 1415 includes the candidate BS list by adjacent BSs which satisfy at least one of a condition in which signal strength is larger than or equal to a signal strength threshold and a condition in which an amount of available resources indicated by the cell loading state information is larger than or equal to a minimum cell load value or an amount of used resources is smaller than a maximum cell load value. In another example, parameters may be used for the candidate BS determination condition when the MS 1400 acquires BS basic setting information, for example, information on a maximum buffer size, a maximum number of antennas, a maximum number of RF chains, and a maximum number of beams. Further, information required for expecting a degree of a service to be received by the MS through the corresponding BS may be also used for the candidate BS determination condition. Then, the controller 1420 controls the transceiver 1405 to transmit the candidate BS list to the serving BS managing the cooperative communication-based cell of the MS 1400. Since the operation according to the embodiments discussed above with regard to FIGS. 2-5 and FIGS. 10-13 of the present disclosure as described above overlap the operation according to FIGS. 3 and 11, a detailed description thereof will be omitted.

Meanwhile, in the operation of the MS 1400 according to the embodiments discussed above with regard to FIGS. 6-9 of the present disclosure, when the transceiver 1405 recognizes reception of the candidate BS list transmitted from the serving BS, the controller 1420 controls the measurement unit 1410 to measure signal strength received from each of the candidate BSs included in the candidate BS list. The candidate BS list transmitted from the serving BS includes adjacent BSs having service quality larger than or equal to a service quality threshold among the adjacent BSs having established the fronthaul with the serving BS. Further, the controller 1420 stores cell loading state information of the candidate BSs which the transceiver 1405 receives through the broadcasting channel. In addition, the controller 1420 sets a candidate BS determination condition by using at least one of a predetermined signal strength threshold and a cell load threshold and transmits the set candidate BS determination condition to the BS list generator 1415. Then, the candidate BS list generator 1415 re-configures the candidate BS list by candidate BSs which satisfy at least one of a condition in which signal strength of each of the candidate BSs included in the candidate BS list is larger than or equal to the signal strength threshold and a condition in which an amount of available resources is larger than or equal to a minimum cell load value or an amount of used resources is smaller than a maximum cell load value. Then, the controller 1420 controls the transceiver 1405 to transmit the re-configured candidate BS list to the serving BS managing the cooperative communication-based cell of the MS 1400.

Figure 15:
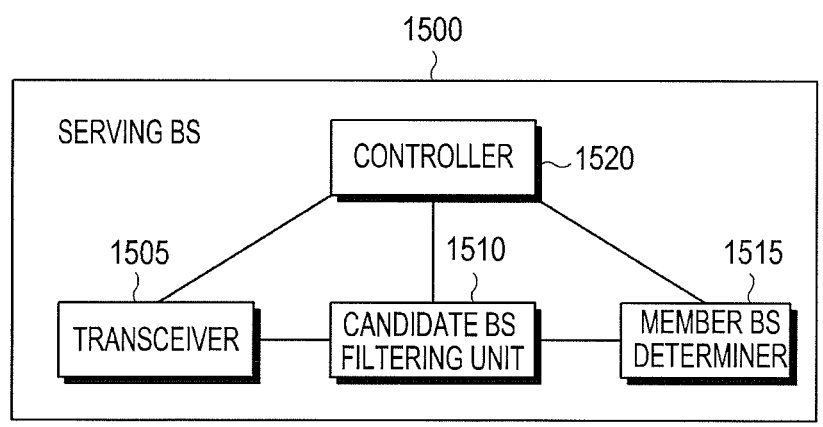
FIG. 15 illustrates a schematic configuration of a serving BS according to an embodiment of the present disclosure.

FIG. 15 illustrates an example of a schematic configuration of the serving BS according to an embodiment of the present disclosure.

Referring to FIG. 15, a serving BS 1500 includes, for example, a transceiver 1505, a candidate BS filtering unit 1510, a member BS determiner 1515, and a controller 1520. For the convenience of description, the configuration of the serving BS 1500 in FIG. 15 is divided into a plurality of units separated by operations according to an embodiment of the present disclosure. However, the configuration of the serving BS may be configured by one unit or divided into other types of sub units according to real implementations.

First, when the serving BS 1500 operates according to the embodiments discussed above with regard to FIGS. 2-5 of the present disclosure, the transceiver 1505 receives a candidate BS list from the MS. The candidate BS list is configured by candidate BSs satisfying a candidate BS determination condition. Since the candidate BS determination condition and the process of generating the candidate BSs overlap the description of FIG. 3, a detailed description thereof will be omitted herein.

When the controller 1520 recognizes reception of the candidate BS list, the controller 1520 determines a total number of member BSs to configure the cooperative communication-based cell of the MS. The number of member BSs is defined as a total number of cooperative BSs except for the serving BS 1500. The number of member BSs corresponds to a number of BSs which does not increase complexity of the operation of the cooperative communication-based cell and maximizes capability of throughput of the cooperative communication-based cell and also corresponds to a number of BSs which can be supported by the MS. The controller 1520 determines a service quality threshold and transmits the determined service quality threshold to the candidate BS filtering unit 1510.

The candidate BS filtering unit 1510 calculates service quality by using BS information of the adjacent BS corresponding to the candidate BS among the BS information through the fronthaul establishment process. The candidate BS filtering unit 1510 determines candidate BSs having service quality larger than or equal to the service quality threshold as targets to receive the member BS negotiation.

Then, the member BS determiner 1515 performs the transaction negotiation with the targets to receive the member BS negotiation and identifies whether a channel state of the corresponding BS satisfies a BS capability state required for the cooperative communication-based cell of the MS. For example, the BS capability state includes a channel state between the corresponding BS and the serving BS 602 (for example, RSSI, path loss and the like), a number of available antennas of the corresponding BS, currently remaining power, available buffer capacity, current cell load, and a number of available RF chains. The targets to receive the member BS negotiation which satisfy the BS capability state are determined as final member BSs. Then, the controller 1520 controls the transceiver 1505 to transmit information on the final member BSs to the MS.

Meanwhile, the operation of the serving BS 1500 according to the embodiments discussed above with regard to FIGS. 10-13 of the present disclosure is almost similar to the operation of the serving BS according to the embodiments discussed above with regard to FIGS. 2-5 of the present disclosure. However, the candidate BS filtering unit 1510 first performs the filtering using the cell loading state information prior to the filtering using the serving quality of the candidate BSs. That is, the candidate BS filtering unit 1510 identifies whether the cell loading state information corresponding to the candidate BSs includes an additional access impossibility indication among the cell loading state information acquired through the fronthaul establishment process with the adjacent BSs or communication with the SON server. As a result of the identification, the candidate BSs including the additional access impossibility indication are excluded from the candidate BS list, and the candidate BS filtering unit 1510 performs the filtering using the serving quality of the remaining candidate BSs.

Last, in the operation of the serving BS 1500 according to the embodiments discussed above with regard to FIGS. 6-9 of the present disclosure, the serving BS 1500 does not wait for reception of the candidate BS list but directly generates the candidate BS list unlike the embodiments discussed above with regard to FIGS. 2-5 and FIGS. 10-13 of the present disclosure. Specifically, the controller 1520 acquires BS information of the adjacent BSs during the fronthaul establishment process with the adjacent BSs. Then, the candidate BS filtering unit 1510 calculates service quality by using the BS information of the adjacent BSs and selects adjacent BSs having the calculated service quality larger than or equal to a service quality threshold. Further, the candidate BS filtering unit 1510 generates a candidate BS list by the selected adjacent BSs. Then, the controller transmits the candidate BS list to the MS through the transceiver 1505.

Thereafter, when the transceiver 1505 recognizes reception of the re-configured candidate BS list from the MS, the controller 1520 controls the member BS determiner 1515 to determine the candidate BSs included in the re-configured candidate BS list as targets to receive the member BS negotiation. Then, the member BS determiner 1515 performs the transaction negotiation with the targets to receive the member BS negotiation and identifies whether BS capability of the corresponding BS satisfies a BS capability state required for the cooperative communication-based cell of the MS. The targets to receive the member BS negotiation which satisfy the BS capability state are determined as final member BSs. Then, the controller 1520 controls the transceiver 1505 to transmit information on the final member BSs to the MS.

Meanwhile, since the configurations of the MS and the serving BS in FIGS. 14 and 15 are equally applied to the member BS update processes in FIGS. 5, 9 and 13 and overlap the previous description, a detailed description thereof will be omitted.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining a set of member base stations (BSs) providing a cooperative communication to a mobile station (MS) at a serving BS in a wireless communication system, the method comprising:
   determining a set of first candidate BSs based on BS information received from at least one neighbor BS, wherein the BS information includes location information of the at least one neighbor BS;
   transmitting, to the MS, a first list comprising the set of the first candidate BSs;
   receiving, from the MS, a second list comprising at least one second candidate BS selected from the set of the first candidate BSs;
   determining at least one member BS for the cooperative communication based on the second list; and
   transmitting, to the MS, information associated with the at least one member BS,
   wherein the location information of the at least one neighbor BS determined as one of the first candidate BSs indicates a location located within a distance determined by a threshold, and
   wherein the location indicated by the location information of the at least one neighbor BS represents a distance from the MS.

2. The method of claim 1, wherein determining the set of the first candidate BSs comprises:
   receiving, from the at least one neighbor BS, the BS information;
   obtaining, using the BS information, a service quality of the at least one neighbor BS that is available for the cooperative communication; and
   determining a first neighbor BS corresponding to a service quality that is greater than or equal to a service quality threshold among the obtained service quality of the at least one neighbor BS as one of the set of the first candidate BSs.

3. The method of claim 2, further comprising:
   if a service quality of a second neighbor BS is less than the service quality threshold,
   obtaining location information of the second neighbor BS from BS information of the second neighbor BS; and
   determining whether the location information of the second neighbor BS indicates a location within a location threshold; and
   if the location information indicates the location within the location threshold, determining the second neighbor BS as one of the set of the first candidate BSs.

4. The method of claim 1, wherein the at least one second candidate BS is satisfied with a candidate BS condition, and the at least one second candidate BS corresponding to a remainder except for at least one first candidate BS does not satisfy the candidate BS condition from the set of the first candidate BSs.

5. The method of claim 4, wherein the candidate BS condition comprises a case where a received signal strength of a first candidate BS measured by the MS is greater than or equal to a signal strength threshold, or a case where a cell loading state of the first candidate BS is greater than or equal to a cell load threshold.

6. The method of claim 1, wherein determining the at least one member BS further comprises:
   transmitting, to the at least one second candidate BS, a request message comprising capability information for the cooperative communication;

receiving, from each of the at least one second candidate BS, a response message comprising capability information corresponding to each of the at least one second candidate BS; and if the capability information of a second candidate BS among the at least one second candidate BS is not satisfied with a threshold for the cooperative communication, deleting the second candidate BS from a list comprising the at least one member BS.

7. The method of claim 1, wherein capability information for the cooperative communication includes at least one of a number of antennas, a present remaining power, an available buffer throughput, a cell load, or a number of radio frequency chains.

8. A method for performing a cooperative communication by a mobile station (MS) in a wireless communication system, the method comprising:

receiving, from a serving base station (BS), a first list comprising a set offirst candidate BSs of a set of member BSs providing the cooperative communication to the MS, wherein the set of the first candidates BSs is determined based on BS information including location information of at least one neighbor BS received from the at least one neighbor BS;

identifying at least one first candidate BS satisfied with a candidate BS condition among the set of the first candidate BSs;

selecting the identified at least one first candidate BS as at least one second candidate BS;

transmitting, to the serving BS, a second list comprising the at least one second candidate BS selected from the set of the first candidate BSs; and receiving, from the serving BS, information associated with at least one member BS determined based on the transmitted second list, wherein the location information of the at least one neighbor BS determined as one of the first candidate BSs indicates a location located within a distance determined by a threshold, and wherein the location indicated by the location information of the at least one neighbor BS represents a distance from the MS.

9. The method of claim 8, wherein a service quality of each of the set of the first candidate BSs is greater than or equal to a service quality threshold, the service quality being available for the cooperative communication, and wherein the service quality is obtained using BS information received from at least one neighbor BS of the serving BS.

10. The method of claim 8, wherein the at least one second candidate BS corresponding to a remainder except for a first candidate BS does not satisfy the candidate BS condition from the set of the first candidate BSs, and wherein the candidate BS condition comprises a case where a received signal strength of a first candidate BS measured by the MS is greater than or equal to a signal strength threshold, or a case where a cell loading state of the first candidate BS is greater than or equal to a cell load threshold.

11. A serving BS for determining a set of member base stations (BSs) providing a cooperative communication to a mobile station (MS) in a wireless communication system, the serving BS comprising:

a transceiver configured to:
transmit, to the MS, a first list comprising a set of first candidate BSs; and receive, from the MS, a second list comprising at least one second candidate BS selected from the set of the first candidate BSs; and a controller configured to:
determine the set of the first candidate BSs based on BS information received from at least one neighbor BS, wherein the BS information includes location information of the at least one neighbor BS;

determine at least one member BS for the cooperative communication based on the second list; and control the transceiver to transmit, to the MS, information associated with the at least one of the set of member BSs, wherein the location information of the at least one neighbor BS determined as one of the first candidate BSs indicates a location located within a distance determined by a threshold, and wherein the location indicated by the location information of the at least one neighbor BS represents a distance from the MS.

12. The serving BS of claim 11, wherein:
the transceiver is further configured to receive, from the at least one neighbor BS, the BS information; and
the controller is configured to:
obtain, using the BS information, a service quality of the at least one neighbor BS that is available for the cooperative communication, and determine a first neighbor BS corresponding to a service quality that is greater than or equal to a service quality threshold among the obtained service quality of the at least one neighbor BS as one of the set of the first candidate BSs.

13. The serving BS of claim 12, wherein the controller is further configured to:
if a service quality of a second neighbor BS is less than the service quality threshold,
obtaining location information of the second neighbor BS from BS information of the second neighbor BS; and
determine whether location information of the second neighbor indicates a location within a location threshold; and
if the location information indicates the location within the location threshold, determine the second neighbor BS as one of the set of the first candidate BSs.

14. The serving BS of claim 11, wherein if a received signal strength of the at least one second candidate BS measured by the MS is greater than or equal to a signal strength threshold, the controller is configured to obtain location information of a second neighbor BS from BS information of the second neighbor BS, determine whether the location information of the second neighbor BS indicates a location within a location threshold, and if the location information indicates the location within the location threshold, the controller is further configured to determine the second neighbor BS as one of the set of the first candidate BSs.

15. The serving BS of claim 11, wherein a candidate BS condition comprises a case where a received signal strength of a first candidate BS measured by the MS is greater than or equal to a signal strength threshold, or a case where a cell loading state of the first candidate BS is greater than or equal to a cell load threshold.

16. The serving BS of claim 11, wherein the transceiver is further configured to:
transmit, to the at least one second candidate BS, a request message comprising capability information for the cooperative communication;

receive, from each of the at least one second candidate BS, a response message comprising capability information corresponding to each of the at least one second candidate BS; and if the capability information of a second candidate BS among the at least one second candidate BS is not satisfied with a threshold for the cooperative communication, wherein the controller is further configured to delete the second candidate BS from a list comprising the at least one member BS.

17. The serving BS of claim 11, wherein capability information for the cooperative communication includes at least one of a number of antennas, a preset remaining power, an available buffer throughput, a cell load, or a number of radio frequency chains.

18. A mobile station (MS) for performing a cooperative communication in a wireless communication system, the MS comprising:
a transceiver configured to receive, from a serving base station (BS), a first list comprising a set of first candidate BSs of a member BS providing the cooperative communication to the MS, wherein the set of the first candidates BSs is determined based on BS information including location information of at least one neighbor BS received from the at least one neighbor BS; and
a controller configured to:
identify whether at least one first candidate BS satisfied with a candidate BS condition among the set of the first candidate BSs;
select the identified at least one first candidate BS as at least one second candidate BS, and
control the transceiver to:
transmit, to the serving BS, a second list comprising the at least one second candidate BS selected from the set of the first candidate BSs; and
receive, from the serving BS, information associated with at least one member BS determined based on the transmitted second list,
wherein the location information of the at least one neighbor BS determined as one of the first candidate BSs indicates a location located within a distance determined by a threshold, and
wherein the location indicated by the location information of the at least one neighbor BS represents a distance from the MS.

19. The MS of claim 18, wherein a service quality of each of the set of the first candidate BSs is greater than or equal to a service quality threshold, the service quality being available for the cooperative communication, and wherein the service quality is obtained using BS information received from at least one neighbor BS of the serving BS.

20. The MS of claim 18, wherein the at least one second candidate BS corresponding to a remainder except for a first candidate BS does not satisfy the candidate BS condition from the set of the first candidate BSs, and
wherein the candidate BS condition comprises a case where a received signal strength of a first candidate BS measured by the MS is greater than or equal to a signal strength threshold, or a case where a cell loading state of the first candidate BS is greater than or equal to a cell load threshold.

* * * * *